(12) United States Patent
Horiuchi et al.

(10) Patent No.: US 9,036,577 B2
(45) Date of Patent: May 19, 2015

(54) WIRELESS COMMUNICATION APPARATUS AND WIRELESS COMMUNICATION METHOD

(75) Inventors: Ayako Horiuchi, Kanagawa (JP); Seigo Nakao, Kanagawa (JP); Masayuki Hoshino, Kanagawa (JP); Daichi Imamura, Kanagawa (JP); Akihiko Nishio, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 71 days.

(21) Appl. No.: 13/702,213

(22) PCT Filed: Jun. 15, 2011

(86) PCT No.: PCT/JP2011/003414
§ 371 (c)(1),
(2), (4) Date: Dec. 5, 2012

(87) PCT Pub. No.: WO2011/161907
PCT Pub. Date: Dec. 29, 2011

(65) Prior Publication Data
US 2013/0077560 A1    Mar. 28, 2013

(30) Foreign Application Priority Data

Jun. 21, 2010   (JP) .................................. 2010-141006
Sep. 17, 2010   (JP) .................................. 2010-210086

(51) Int. Cl.
| H04W 72/04 | (2009.01) |
| H04W 72/08 | (2009.01) |
| H04W 72/14 | (2009.01) |
| H04W 84/04 | (2009.01) |
| H04W 76/02 | (2009.01) |
| H04L 5/00 | (2006.01) |

(52) U.S. Cl.
CPC ............ *H04W 72/044* (2013.01); *H04W 72/04* (2013.01); *H04W 84/047* (2013.01); *H04W 76/02* (2013.01); *H04W 72/08* (2013.01); *H04W 72/14* (2013.01); *H04L 5/0051* (2013.01); *H04L 5/0053* (2013.01)

(58) Field of Classification Search
None
See application file for complete search history.

(56) References Cited

U.S. PATENT DOCUMENTS

| 2008/0293424 A1* | 11/2008 | Cho et al. ........................ 455/450 |
| 2009/0003274 A1* | 1/2009 | Kwak et al. .................... 370/329 |
| 2009/0073929 A1* | 3/2009 | Malladi et al. ................. 370/329 |

(Continued)

OTHER PUBLICATIONS

R1-102700, "Backhaul Control Channel Design in Downlink", LG Electronics Inc., TSG-RAN WG1 Meeting #61, Montreal, Canada, May 10 to 14, 2010.

(Continued)

*Primary Examiner* — Bunjob Jaroenchonwanit
(74) *Attorney, Agent, or Firm* — Pearne & Gordon LLP

(57) ABSTRACT

To improve the channel estimation accuracy of "DL grant" that instructs data allocation of a downlink of R-PDCCH. A wireless communication apparatus according to an aspect of the invention includes a receiver that is configured to receive a control signal, and a blind decoder that is configured to perform a blind decoding of a plurality of adjacent physical, resource blocks (PRBs) in which the same preceding is used in a unit of an RB group (RBG) that is composed of the plurality of PRBs, and to detect a resource area to which a control signal for the wireless communication apparatus that is included in the control signal is allocated.

13 Claims, 27 Drawing Sheets

(56) References Cited

U.S. PATENT DOCUMENTS

| | | | |
|---|---|---|---|
| 2009/0109915 A1* | 4/2009 | Pasad et al. | 370/329 |
| 2009/0141690 A1* | 6/2009 | Fan et al. | 370/335 |
| 2009/0175230 A1* | 7/2009 | Callard et al. | 370/329 |
| 2009/0207797 A1* | 8/2009 | Shen et al. | 370/329 |
| 2009/0232075 A1* | 9/2009 | Konta | 370/329 |
| 2009/0245190 A1* | 10/2009 | Higuchi et al. | 370/329 |
| 2010/0061359 A1* | 3/2010 | Fukuoka et al. | 370/342 |
| 2010/0098020 A1* | 4/2010 | Kim et al. | 370/330 |
| 2010/0118807 A1* | 5/2010 | Seo et al. | 370/329 |
| 2010/0142467 A1* | 6/2010 | Tiirola et al. | 370/329 |
| 2010/0189032 A1* | 7/2010 | Chen et al. | 370/328 |
| 2010/0279628 A1* | 11/2010 | Love et al. | 455/70 |
| 2011/0013730 A1* | 1/2011 | Mansson et al. | 375/340 |
| 2011/0070845 A1* | 3/2011 | Chen et al. | 455/91 |
| 2011/0134861 A1* | 6/2011 | Seo et al. | 370/329 |
| 2011/0164584 A1* | 7/2011 | Seo et al. | 370/329 |
| 2011/0243059 A1* | 10/2011 | Liu et al. | 370/315 |
| 2011/0255505 A1* | 10/2011 | Liu et al. | 370/330 |
| 2011/0267967 A1* | 11/2011 | Ratasuk et al. | 370/252 |
| 2012/0014330 A1* | 1/2012 | Damnjanovic et al. | 370/329 |
| 2012/0327843 A1* | 12/2012 | Kim et al. | 370/315 |
| 2013/0010685 A1* | 1/2013 | Kim et al. | 370/315 |
| 2013/0034070 A1* | 2/2013 | Seo et al. | 370/329 |
| 2013/0182679 A1* | 7/2013 | Seo et al. | 370/330 |
| 2013/0294376 A1* | 11/2013 | Nakao et al. | 370/329 |
| 2013/0301593 A1* | 11/2013 | Gaal et al. | 370/329 |
| 2014/0086189 A1* | 3/2014 | Takeda et al. | 370/329 |

OTHER PUBLICATIONS

Ericsson, ST Ericsson, Considerations on R-PDCCH design, 3GPP TSG-RAN WG1 #61, May 14, 2010, R1-102634.

Panasonic, R-PDCCH placement, 3GPP TSG RAN WG1 Meeting #61, May 14, 2010, R1-102881.

International Search Report for PCT/JP2011/003414 dated Aug. 30, 2011.

3 GPP TSG RAN WGA Meeting #49-bis, Design of PDCCH format in support of MIMO, 5.13.1, Jun. 25-29, 2007, Orlando.

3GPP TSG-RAN WG1 Meeting #61, On DL Backhaul Control Channel Design Aspects, 6.6.1.2, May 10-14, 2010, Montreal, Canada.

* cited by examiner

| System band width | PRG size | RBG size |
|---|---|---|
| ≤10 RBs | 1 | 1 |
| 11-26 RBs | 2 | 2 |
| 27-63 RBs | 2 or 3 | 3 |
| 64-110 RBs | 2 | 4 |

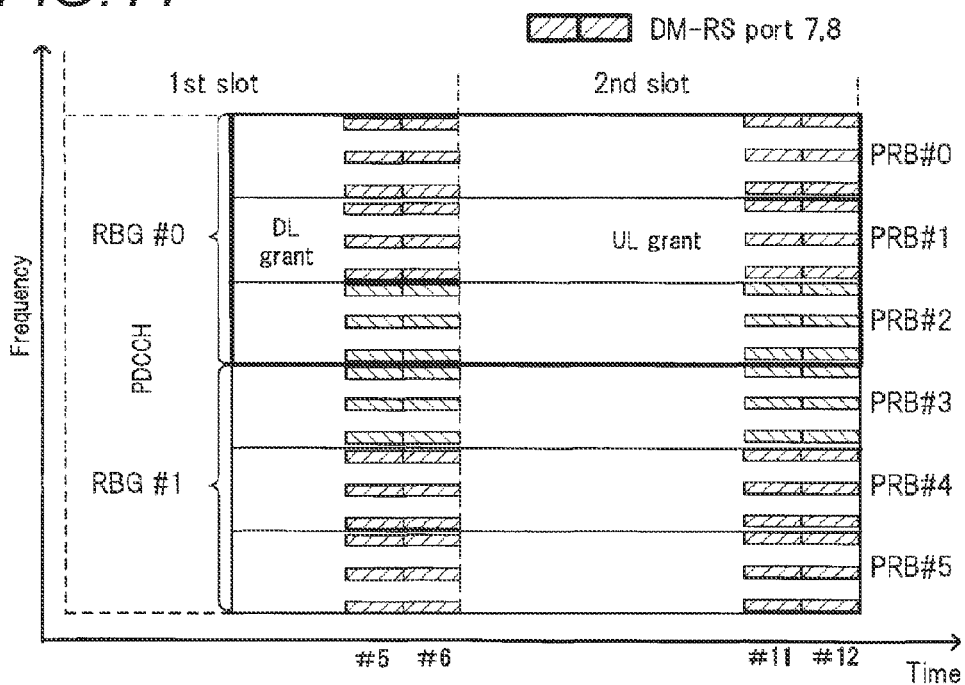
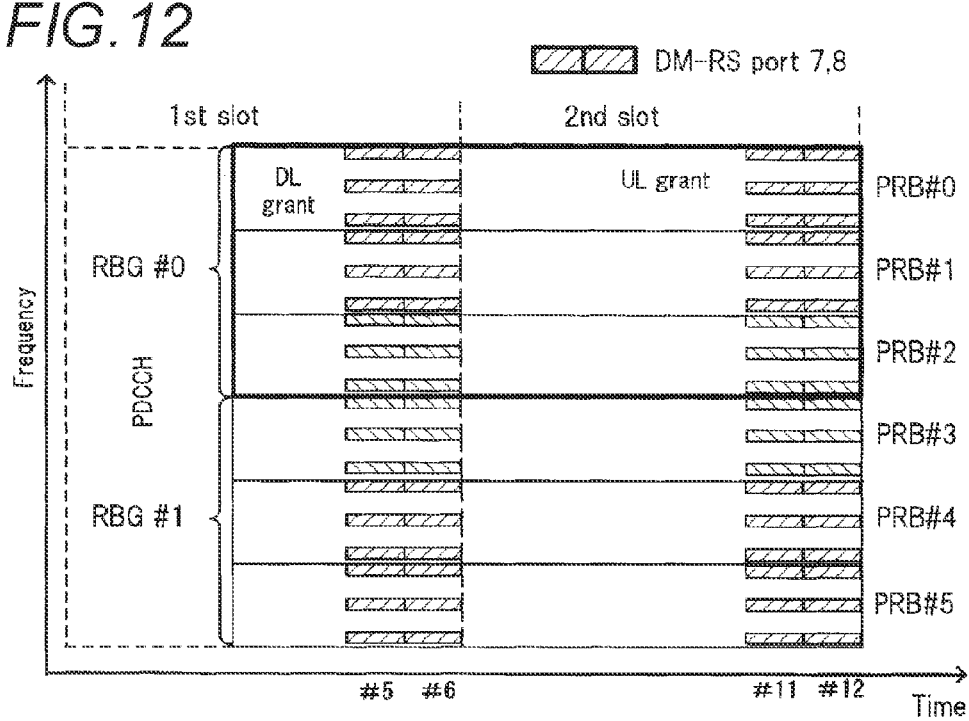

FIG.27
(a)
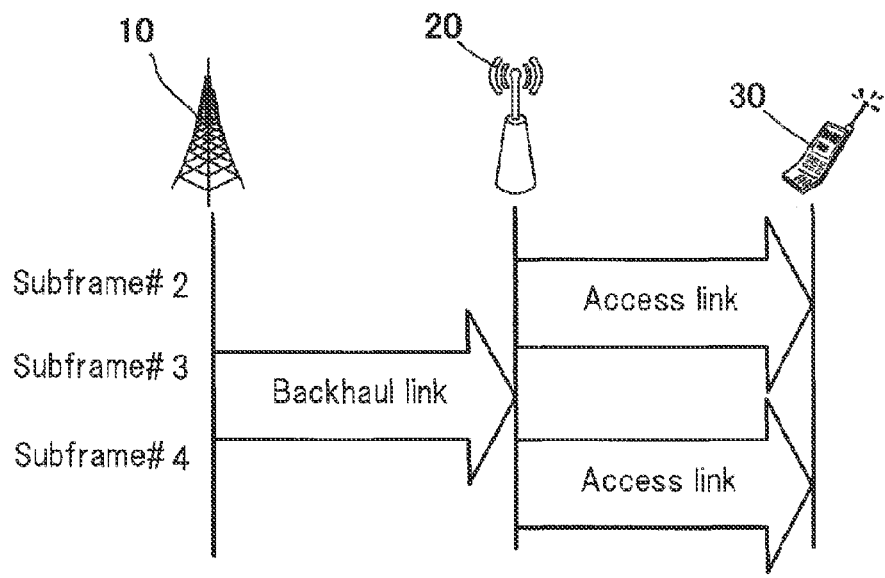
(b)
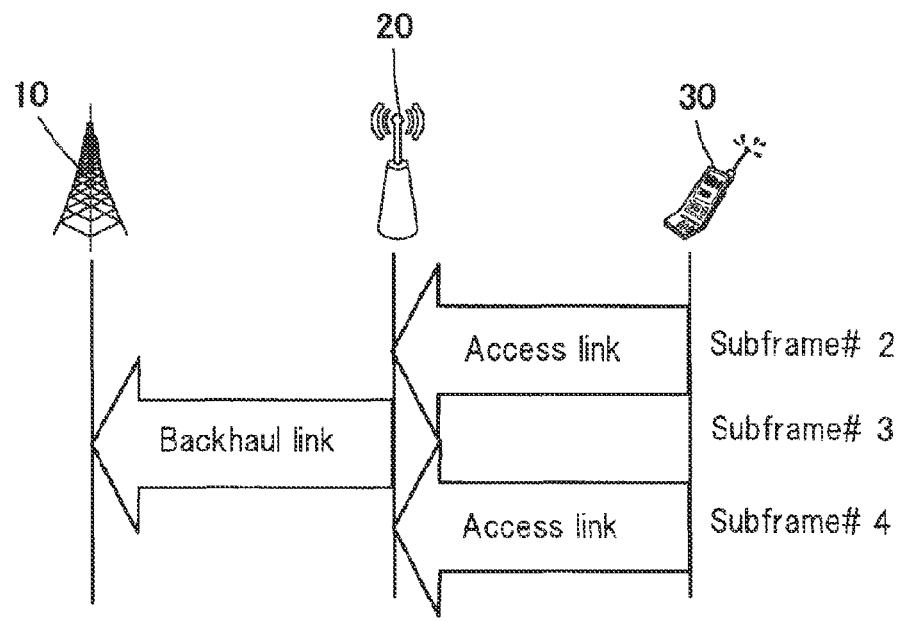

WIRELESS COMMUNICATION APPARATUS AND WIRELESS COMMUNICATION METHOD

TECHNICAL FIELD

The present invention relates to a wireless communication apparatus and a wireless communication method, and more particularly, to a wireless communication apparatus and a wireless communication method capable of performing communication through a relay transmission technique.

BACKGROUND ART

In recent years, in cellular mobile communication systems, transmission of large volumes of data such as still image data and moving-image data as well as audio data has been generalized with accompanying the increase of multimedia information. Techniques for realizing a high-transmission rate using a high-frequency wireless band have been actively studied to realize the transmission of large volumes of data.

When the high-frequency wireless band is used, however, a high-transmission rate is expected over a short distance, but attenuation increases as the transmission distance increases. Accordingly, when a mobile communication system using a high-frequency wireless band is actually operated, a coverage area of a wireless communication base station apparatus (hereinafter, simply referred to as a base station) is reduced. Therefore, it is necessary to install more base stations. Since the installation cost of base stations is considerable, techniques are required to realize communication services using a high-frequency wireless band while reducing the number of base stations.

For such a demand, in order to expand a coverage area of each base station, as shown in a wireless relay system in FIGS. 27(a) and 27(b), a relay transmission technique is considered, in which a wireless communication relay station device (Relay Node; RN) 20 (hereinafter referred to as "relay station" 20) is installed between a base station (evolved Node B; eNB) 10 and a wireless communication mobile station device (User Equipment; UE) 30 (hereinafter referred to as "mobile station" 30), and communication between the base station 10 and the mobile station 30 is performed through the relay station 20. Using the relay technique, even the mobile station, which is unable to directly communicate with the base station 10, can communicate through the relay station.

[Explanation of TD Relay]

LTE-A (Long Term Evolution Advanced) system is demanded to maintain compatibility with LTE from the viewpoint of a smooth shift from LTE and coexistence with LTE. Accordingly, even with respect to a relay technique, it is demanded to achieve mutual compatibility with LTE. In the LTE-A system, in order to achieve the mutual compatibility with LTE, it is considered to set an MBSFN (Multicast/Broadcast over Single Frequency Network) subframe during transmission from a base station to a relay station in a downlink (hereinafter referred to as "DL").

Next, referring to FIG. 27(a), a TD relay will be described. FIG. 27(a) is a conceptual diagram explaining a TD relay in a downlink, and FIG. 27(b) is a conceptual view explaining a Td relay in an uplink. The TD relay (which is called a half duplex relay or type 1 relay) divides by time transmission from the base station 10 to the relay station 20 and transmission from the relay station 20 to the mobile station 30.

In the uplink illustrated in FIG. 27(b), in subframe #2, transmission from the mobile station 30 to the relay station 20 is performed by an access link, and in subframe #3, communication from the relay station 20 to the base station 10 is performed by a backhaul link. In subframe #4, transmission from the mobile station 30 to the relay station 20 is performed again. In the same manner, in the downlink illustrated in FIG. 27(a), in subframe #2, transmission from the relay station 20 to the mobile station 30 is performed by an access link, and in subframe #3, communication from the base station 10 to the relay station 20 is performed by a backhaul link. In subframe #4, transmission from the relay station 20 to the mobile station 30 is performed again.

As described above, by dividing the communication of the backhaul and the communication of the access link of the relay station 20 by time domain, the time when the relay station 20 performs transmission and the time when the relay station 20 performs reception can be divided. Accordingly, the relay station 20 can relay signals without being affected by temporal difference between a transmission antenna and a reception antenna.

Further, in the downlink, an MBSFN subframe is set in an access link. The "MBSFN subframe" is a subframe that is defined to transmit MBMS (Multimedia Broadcast Multicast Service) data. The operation of an LTE terminal is determined so that the LTE terminal does not use a reference signal in the MBSFN subframe.

Accordingly, in LTE-A, a technique has been proposed to avoid an erroneous detection of the reference signal, of an LTE terminal by setting the subframe of the access link side of the relay station cell to the MBSFN subframe in the subframe for the backhaul link in which the relay station 20 communicates with the base station 10. FIG. 28 is a diagram illustrating an example of allocation of a control signal and data in the subframe in each station in the LTE system. As shown in FIG. 28, in the LTE system, the control signal of each station is arranged in front of the subframe. Due to this, the relay station 20 must transmit a control signal (PDCCH: Physical Downlink Control Channel) portion to the mobile station 30 even in the MBSFN subframe. The relay station 20 switches to reception of the backhaul link after transmitting the control signal to the mobile station 30 by the access link, to receive the signal from the base station 10. Accordingly, the relay station 20 is unable to receive the control signal transmitted by the base station 10 while the base station 10 transmits the control signal, to the mobile station 30 by the access link. Due to this, in the LTE-A, it is considered to newly arrange the control signal for the relay station (R-PDCCH) in the data area.

[Explanation of a Control Signal]

The control signal of the LTE system is transmitted from the base station to the mobile station using, for example, a downlink control channel such as PDCCH (Physical Downlink Control Channel). PDCCH includes a "DL grant" that instructs data allocation of DL, and "UL grant" that instructs data allocation of uplink (hereinafter also referred to as "UL").

As described in Non-Patent Literature 1, it is considered to arrange "DL grant" at a first slot as the control signal for a relay station (R-PDCCH), and to arrange "UL grant" at a second slot. By arranging "DL grant" only at the first slot as the control signal for a relay station (R-PDCCH), decoding delay of "DL grant" can be shortened, and the relay station can prepare for the transmission (after four subframes in FDD) of ACK/NACK for DL data.

Further, it is considered that PRB (Physical Resource Block) in which R-PDCCH is arranged differs for each relay station. FIG. 29 shows an arrangement example of R-PDCCH. The vertical axis of FIG. 29 represents frequency and the horizontal axis of FIG. 29 represents time. As illustrated in FIG. 29, in the same subframe, R-PDCCH for relay station RN1 is arranged in PRB #1, and R-PDCCH for another relay station RN2 is arranged in PRB #6, 7.

Further, the relay station 20 performs blind decoding of R-PDCCH in a search space of R-PDCCH that is instructed as "higher layer signaling" from the base station 10.

[Aggregation Size of R-PDCCH]

In the same manner as PDCCH of the LTE system, it is considered to prepare plural aggregation sizes in order to change the encoding rate of "DL grant" and "UL grant" by channel quality. FIG. 30 is a conceptual diagram illustrating aggregation size of R-PDCCH. In the drawing of the aggregation size of each R-PDCCH, the vertical, axis represents frequency, and the horizontal axis represents time. As shown in FIG. 30, since the encoding rate becomes heightened as the aggregation size becomes smaller, such as 8, 4, 2, 1, R-PDCCH having a small aggregation size is suitable to a case where channel quality between the base station 10 and the relay station 20 is good.

The base station 10 determines the aggregation size of R-PDCCH by estimating the channel quality between the own station and the relay station 20, and transmits R-PDCCH that is generated based on the determined aggregation size to the relay station 20. Since the relay station 20 does not know the aggregation size that is changed every subframe in advance, it performs blind decoding of R-PDCCH in plural aggregation sizes.

[Arrangement of DM-RS]

In LTE-A, DM-RS (Demodulation Reference Signal) that is used for channel estimation is arranged on two rear symbols of each slot. FIG. 31 shows the arrangement example of DM-RS. The vertical axis of FIG. 31 represents frequency and the horizontal axis of FIG. 31 represents time. As shown in FIG. 31, in the case of a normal, subframe, DM-RS (inscribed, as DM-RS port 7, 8 in FIG. 31) is arranged in OFDM symbol #5, #6 and OFDM symbol #11, #12.

CITATION LIST

Non-Patent Literature

Non-Patent Literature 1: R1-102700, "Backhaul Control Channel Design in Downlink", LG Electronics Inc., TSG-RAN WG1 Meeting #61, Montreal, Canada, 10th to 14th, May, 2010

Non-Patent Literature 2: R1-102881, "R-PDCCH placement", Panasonic, 3GPP TSG RAN WG1 Meeting #61, Montreal, Canada, 10th to 14th May, 2010

SUMMARY OF INVENTION

Technical Problem

However, in consideration of decoding delay in FIG. 31, "DL grant" that instructs data allocation of a downlink of R-PDCCH must estimate a channel only with DM-RS that is arranged in OFDM symbol #5, #6 that is in the rear of the first slot. On the other hand, "UL grant" that instructs data allocation of an uplink of R-PDCCH may use DM-RS that is arranged in the rear of the first slot (OFDM symbol #5, #6) and DM-RS that is arrange in the rear of the second slot (OFDM symbol #11, #12). Accordingly, in comparison to "UL grant", "DL grant" can use only a half of DM-RS, and thus there is a problem that the channel estimation accuracy deteriorates.

Accordingly, an object of the present invention is to provide a wireless communication apparatus and a wireless communication method, which can improve the channel estimation accuracy of "DL grant" that instructs data allocation of a downlink of R-PDCCH.

The present invention provides a wireless communication apparatus, including: a receiver that is configured to receive a control signal; and a blind decoder that is configured to perform a blind decoding of a plurality of adjacent physical resource blocks (PRBs) in which the same preceding is used in a unit of an RB group (RBG) that is composed of the plurality of PRBs, and to defect a resource area to which a control signal for the wireless communication apparatus that is included in the control signal is allocated.

The present invention also provides a wireless communication apparatus, including: a search space determiner that is configured to determine a search space in a unit of an RB group (RBG) that is composed of a plurality of physical resource blocks (PRBs); an aggregation size determiner that is configured to determine an aggregation size of a control signal for a communication partner apparatus based on a channel quality between the wireless communication apparatus and the communication partner apparatus; an allocator that is configured to allocate the control signal for the communication partner apparatus to a plurality of adjacent PRBs in which the same preceding is used among the plurality of PRBs included in the search space, based on the determined aggregation size and the channel quality; and a transmitter that is configured to transmit the allocated control signal for the communication partner apparatus.

The present invention also provides a wireless communication method, including: receiving a control signal; and performing a blind decoding, as a search space, of a plurality of adjacent physical resource blocks (PRBs) in which the same preceding is used in a unit of RB group (RBG) that is composed of a plurality of PRBs, and detecting a resource area to which a control signal for an own apparatus that is included in the control signal is allocated.

The present invention also provides a wireless communication method, including: determining a search space in a unit of an RB group (RBG) that is composed of a plurality of physical resource blocks (PRBs); determining an aggregation size of a control signal for a communication partner apparatus based on a channel quality between an own apparatus and the communication partner apparatus; allocating the control signal, for the communication partner apparatus to a plurality of adjacent PRBs in which the same preceding is used among the plurality of PRBs included in the search space based on the determined aggregation, size and the channel quality; and transmitting the allocated control, signal for the communication, partner apparatus.

Advantageous Effects of Invention

According to the wireless communication apparatus and the wireless communication method according to the present invention, the channel, estimation accuracy of "DL grant" that instructs data allocation of the downlink of R-PDCCH can be improved.

BRIEF DESCRIPTION OF DRAWINGS

FIG. 11 is a diagram illustrating example (8) of "PRB bundling" allocated to R-PDCCH.

FIG. 12 is a diagram illustrating example (9) of "PRB bundling" allocated to R-PDCCH.

In FIG. 27, (a) is a conceptual, diagram illustrating a TD relay in a downlink, and (b) is a conceptual diagram illustrating a TD relay in an uplink.

DESCRIPTION OF EMBODIMENT

Hereinafter, embodiments of the present invention will be described with reference to the drawings.

Embodiment 1

In a communication, system according to embodiment 1, if a base station 100 designates a search space of R-PDCCH to a relay station 200 in the unit of a resource block group (RBG), the base station 100 allocates plural physical resource blocks (PRBs), which is targeted for "PRB bundling", among plural physical resource blocks (PRBs) that constitute the RBG to R-PDCCH, and thus channel estimation accuracy of "DL grant" that instructs data allocation of a downlink of R-PDCCH is improved.

Further, in the communication system according to this embodiment, the base station 100 establishes the physical resource blocks (PRBs), of which the relay station 200 performs blind decoding, among the plural physical resource blocks (PRBs) that constitute the RBG, and thus the relay station 200 can reduce the number of times of blind decoding.

[Regarding Search Space of R-PDCCH]

Here, the search space of R-PDCCH will be described. The search space of R-PDCCH is reported from the base station 100 to the relay station 200 by "higher layer signaling". Although both the PRB unit and the RBG unit may be considered as the unit that the search space is notified of, the RBG unit is exemplified in the communication system according to this embodiment. Further, the resource block group (RBG) is the unit that is used in the case where the plural PRBs are gathered and allocated. The RBG size is determined by a bandwidth of the communication system. In the case where R-PDCCH is designated as the unit of the resource block group (RBG), a part of PRBs, rather than all PRBs in the RBG, may be used for R-PDCCH.

Figure 1:
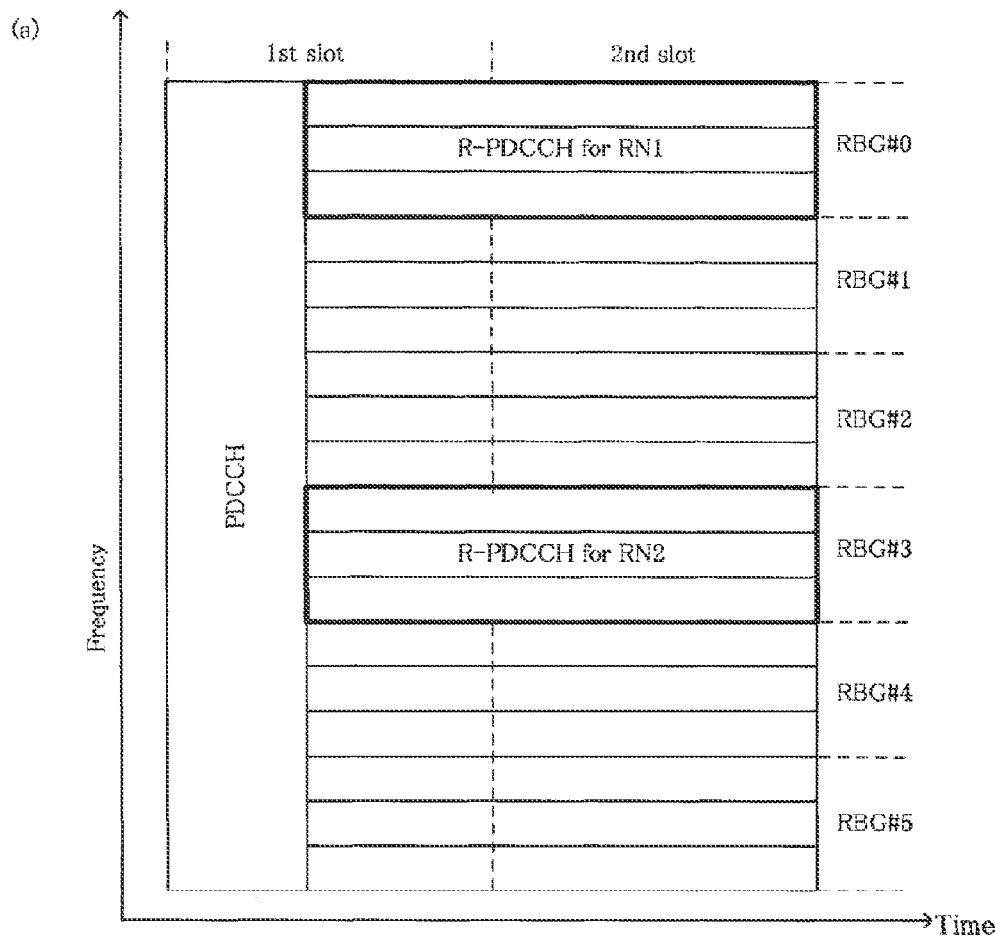
In FIG. 1, (a) to (c) are diagrams illustrating arrangement examples of R-FDCCH in RBG.

FIGS. 1(a) to 1(c) are diagrams illustrating arrangement examples of R-PDCCH in RBG. In the drawing, for convenience in explanation, the plural relay stations 200 are listed and distinguished as a relay station RN1 and a relay station RN2. Further, the RBG size is 3. FIG. 1(a) illustrates an arrangement example of R-PDCCH in the RBG with respect to the relay stations RN1 and RN2, FIG. 1(b) illustrates an arrangement example of R-PDCCH for relay station RN1 in RBG #0, and FIG. 1(c) illustrates an arrangement example of R-PDCCH for relay station RN2 in RGG #3.

As shown in FIG. 1(a), RBG #0 is allocated to the relay station RN1 and RBG #3 is allocated to the relay station RN2. As shown in FIG. 1(b), R-PDCCH is arranged in PRB #0 among PRB #0, 1, and 2 that are included in RBG #0 allocated for the relay station RN1, and "DL grant" and "UL grant" are transmitted. At this time, PRB #1 and PRB #2, which have not been used for R-PDCCH, may allocate data (R-) PDSCH for the relay station or data PDSCH for the other mobile station. As shown in FIG. 1(e), R-PDCCH is arranged in PRB #10, among PRB #9, 10, and 11 that are included in RBG #3 allocated for relay station RN2, "DL grant" is transmitted. In the case where "UL grant" is not transmitted to the second slot of R-PDCCH of PRB #10, as shown in FIG. 1(c), R-PDCCH or PDSCH for the relay station may be allocated.

In FIG. 1(a), if all the PRBs in the RBG that is designated as the search spacer are targeted for blinding decoding of R-PDCCH, the relay station RN1 or the relay station RN2 must search, for all the PRBs, and the number of blind decoding is increased.

However, in the communication system according to this embodiment, the base station 100 determines that the physical resource blocks (PRBs), of which the relay station 200 performs blind decoding, among the plural physical resource blocks (PRBs) that constitute the RBG are the plural physical, resource blocks (PRBs) that are targeted for "PRB bundling".

[PRB Bundling]

"PRB bundling" is a technique that improves the channel estimation accuracy through using the same preceding with respect to plural adjacent PRBs in the case of using DM-RS that can turn a different beam to every relay station or mobile station as a reference signal, (see Non-Patent Literature 2).

[PRG Size]

Figures 2, 3:
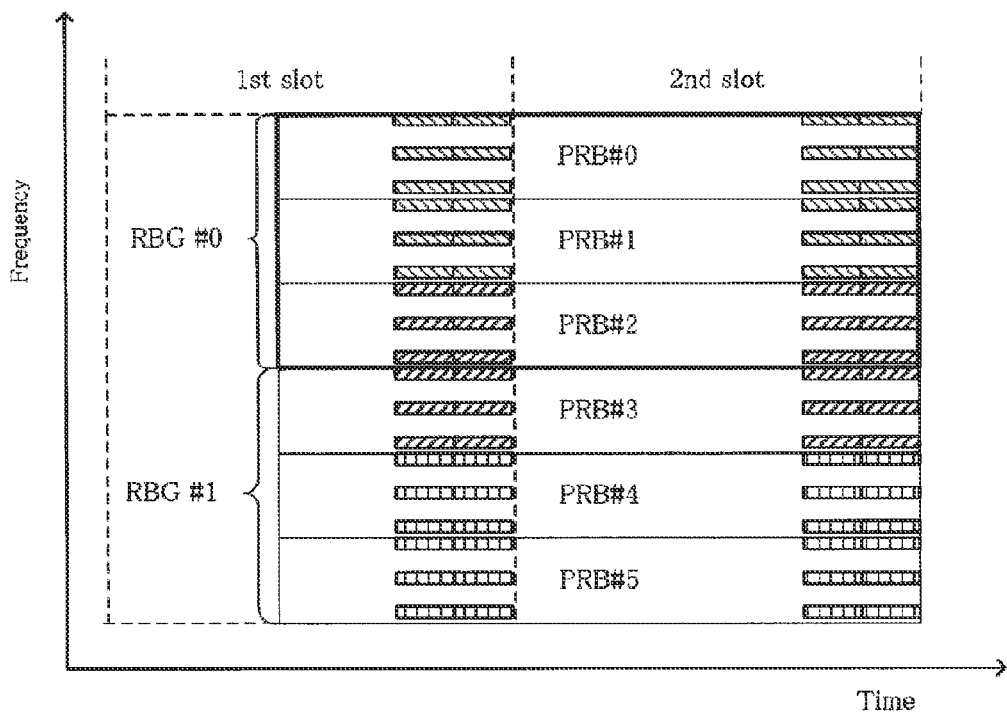
FIG. 2 is a diagram illustrating PRG sizes.
FIG. 3 is a diagram illustrating positions of PRBs of which the same precoding is performed by "PRB bundling".
Figure 4:
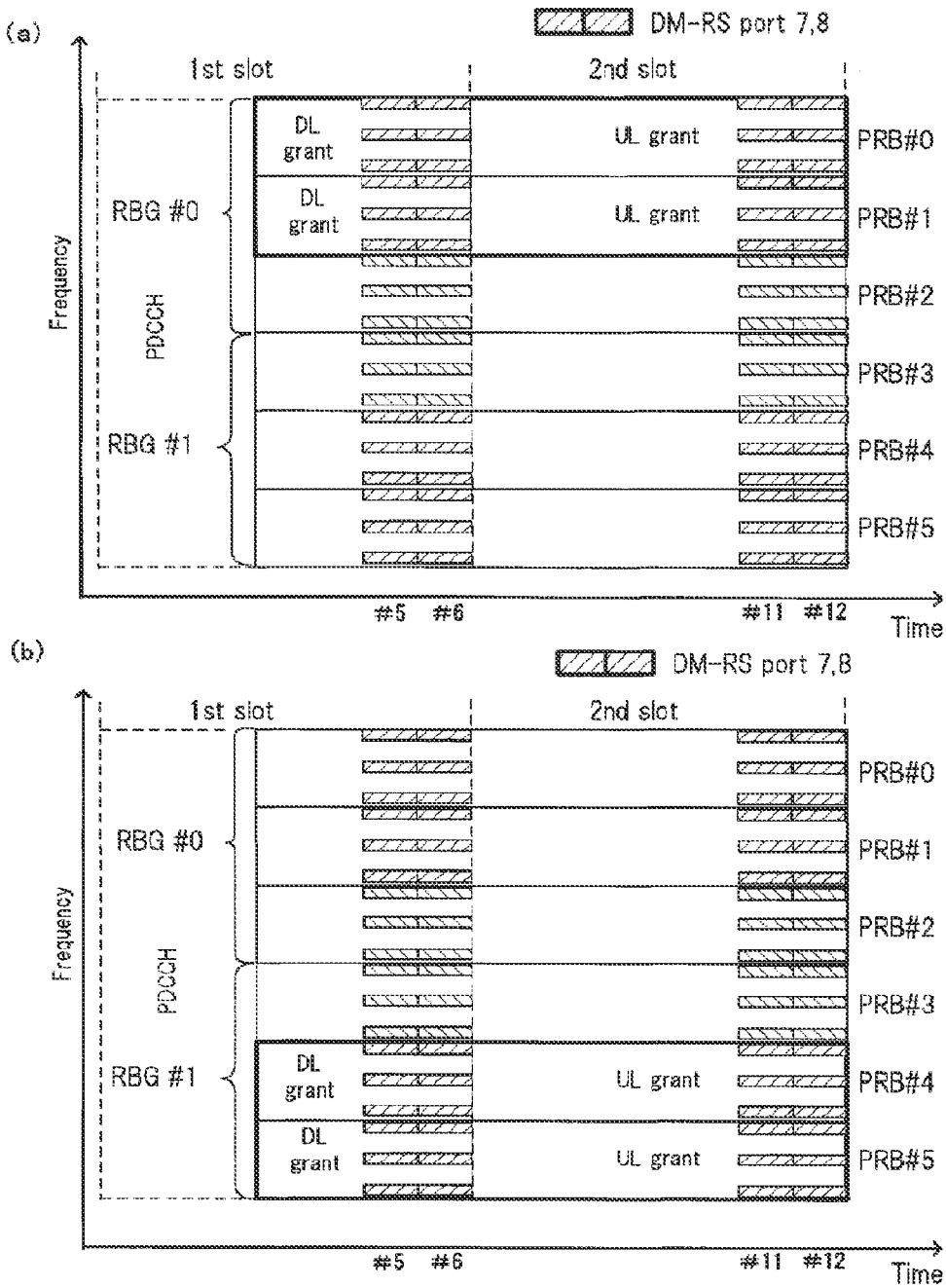
In FIG. 4, (a) and (b) are diagrams illustrating example (1) of "PRB bundling" allocated to R-PDCCH.

Different PRG size values are set depending on the number of RBs (in the drawing, inscribed as RBs) included in the system bandwidth. Referring to FIG. 2, PRG (Preceding RB Groups) sizes will be described. FIG. 2 is a diagram illustrating PRG sizes. As shown in FIG. 2, in the case where the number of RBs is in the range of 27 to 63, it is considered that the PRG size is 2 or 3. The reason why it is considered that the PRG size is 2 or 3 is as follows. Since the number of DM-RSs that can be considered as the same precoding is increased as the PRG size becomes larger, the SNR of the reference signal can be heightened while as the PRG size becomes larger, the influence of the frequency selectivity fading becomes non-uniform, and thus an optimum beam cannot be set. Accordingly, by the trade-off of both parties, the PRG size is set to 2 or 3.

Accordingly, in the communication system according to this embodiment, by using the same settings as those illustrated in FIG. 2 with respect to the RPG (Preceding RB Groups) sizes of R-PDCCH, the SNR of the reference signal is heightened, the influence of the frequency selectivity fading becomes uniform, and a good beam can be set.

As described above, in the communication system according to this embodiment, the base station 100 determines that the physical resource blocks (PRBs), of which the relay station 200 performs blind decoding, among the plural physical resource blocks (PRBs) that constitute the RBG are the plural physical resource blocks (PRBs) that are targeted for "PRB bundling". Further, the base station 100 allocates the plural physical resource blocks (PRBs) that are targeted for "PRB bundling", among the plural PRBs that constitute the RBG, to R-PDCCH. Accordingly, in the communication system according to this embodiment, the channel estimation accuracy of "DL grant" that instructs data allocation of the downlink of R-PDCCH can be improved. Further, the relay station 200 can reduce the number of blind decoding.

[RBG Size 3; PRG Size 2]

Referring to FIG. 3, the position of the PRB of which the same preceding is performed by "PRB bundling" will be described. FIG. 3 is a diagram illustrating positions of PRBs of which the same precoding is performed by "PRB bundling". In the case where the RBG size is 3 and the PRG size is 2, the PRGs may be set through different RBGs. FIG. 3 illustrates an example in which the base station 100 allocates RBG #0 and RBG #1 to the same relay station 200.

In an example illustrated in FIG. 3, PRB #0 and PRB #1 that are included in RBG #0 correspond to the same precoding. PRB #2 included in RBG #0 and PRB #3 included, in RBG #1 correspond to the same preceding through different RBG #0 and RBG #1. PRB #4 and PRB #5 included in RBG #1 correspond to the same precoding. However, for example, in the case where RBG #0 is allocated to one relay station and RBG #1 is allocated to the other relay station as shown in FIG. 3, different precoding may be taken with respect to PRB #2 included in RBG #0 and RPB #3 included in RBG #1.

That is, in the example illustrated in FIG. 3, in RBG #0 and RBG #1, the positions of PRBs of which the same precoding is performed, differ from each other. In RBG #0, two PRBs (PRB #0 and PRB #1) having small PRB numbers correspond to the same precoding, and in RBG #1, two PRBs (PRB #4 and PRB #5) having large PRB numbers correspond to the same precoding. Accordingly, the base station 100 properly changes the PRB that is targeted for PRB bundling, among PRBs included in the search space, by the position of the PRB.

Accordingly referring to FIGS. 4 to 17, examples (1) to (14) of "PRB bundling" which the base station 100 allocates to R-PDCCH according to aggregation size will be described. In the respective drawings, vertical axis represents frequency, and horizontal axis represents time. Further, in the respective drawings, DM-RS (inscribed as DM-RS port 7, 8) is arranged, in OFDM symbol #5, #6 and OFDM symbol #11, #12.

(In the Case of Aggregation Size 2)

Referring to FIGS. 4(a) and 4(b), example (1) of "PRB bundling" allocated to R-PDCCH will be described. If the aggregation size of R-PDCCH is 2, the base station 100 transmits R-PDCCH using two PRBs. In the example (1) illustrated in FIGS. 4(a) and 4(b), the base station 100 arranges R-PDCCH in two PRBs that are targeted for PRB bundling among PRBs included in the RBG.

As shown in FIG. 4(a), the base station 100 arranges R-PDCCH for relay station 200 in PRB #0 and PRB #1 having small PRB numbers in RBG #0. R-PDCCH includes "DL grant" that instructs data allocation of DL and "UL grant" that instructs data allocation of UL. Further, DM-RS (inscribed as DM-RS port 1, 3 in FIG. 4(a)) that is used for channel estimation is arranged in two rear symbols (OFDM symbol #5, #6 and OFDM symbol #11, #12) of each slot. Accordingly, in the example illustrated, in FIG. 4(a), the relay station 200, in consideration of decoding delay, may perform channel estimation with respect to "DL grant" that instructs the data allocation of the downlink of R-PDCCH by DM-RS of PRB #0 and PRB #1 included in RBG #0.

As shown in FIG. 4(b), the base station 100 arranges R-PDCCH for relay station 200 in PRB #4 and PRB #5 having large PRB numbers in RBG #1. R-PDCCH includes "DL grant" that instructs data allocation of DL and "UL grant" that instructs data allocation of UL. Further, DM-RS (inscribed as DM-RS port 7, 3 in FIG. 4(b)) that, is used for channel estimation is arranged in two rear symbols (OFDM symbol #5, #6 and OFDM symbol #11, #12) of each slot. Accordingly, in the example illustrated, in FIG. 4(b), the relay station 200, in consideration of decoding delay, may perform channel estimation with respect to "DL grant" that instructs the data allocation of the downlink of R-PDCCH by DM-RS of PRB #4 and PRB #5 included in RBG #1.

Figure 31:
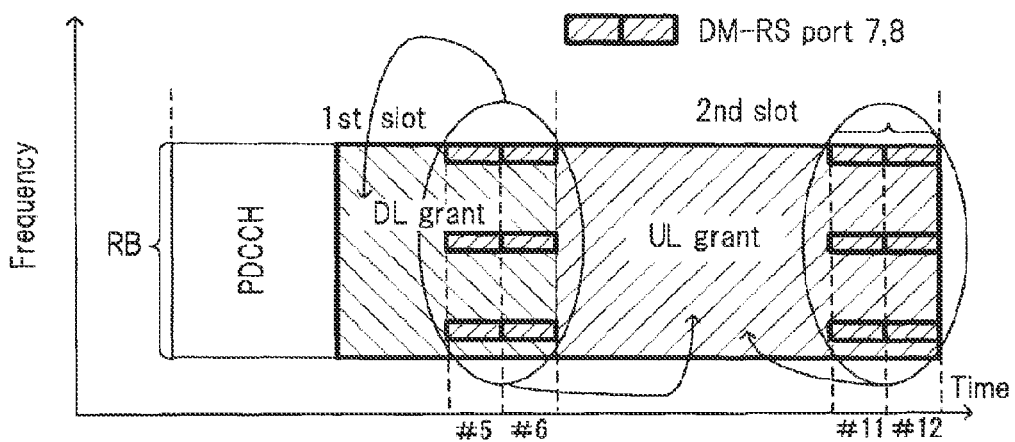
FIG. 31 is a diagram illustrating an arrangement example of DIVJ-RS.

As described above with reference to FIGS. 4(a) and 4(b), if the relay station 200 receives R-PDCCH of aggregation size 2 in a state where the base station 100 determines the PRB of which the relay station 200 performs blind decoding in advance, the relay station 200 can perform channel estimation that the same precoding has been taken between DM-RS using the DM-RS arranged in two adjacent PRBs. Accordingly, in the communication system according to this embodiment, the channel estimation accuracy of the relay station 200 can be improved. In the communication system according to this embodiment, particularly in comparison to the example illustrated in FIG. 31, the channel estimation accuracy of the relay station 200 can be improved with respect to "DL grant" that instructs data allocation, of the downlink of R-PDCCH.

Further, in the communication system according to this embodiment, it is determined that two of the three PRBs are determined as PRBs in which R-PDCCH is arranged. Accordingly, the relay station 200 may perform blind decoding by a combination of two adjacent PRBs of which the same precoding has been performed. Accordingly, in the system, according to this embodiment, in comparison to the case where the relay station 200 performs blind decoding with respect to all combinations of three PRBs included in the RBG, the number of blind decoding that is performed by the relay station 200 can be reduced. Further, in the communication system according to this embodiment, information on which PRB included in the RBG is targeted for the same precoding may be shared, between the base station 100 and the relay station 200 in advance.

(In the Case of Aggregation Size 4)

Figure 5:
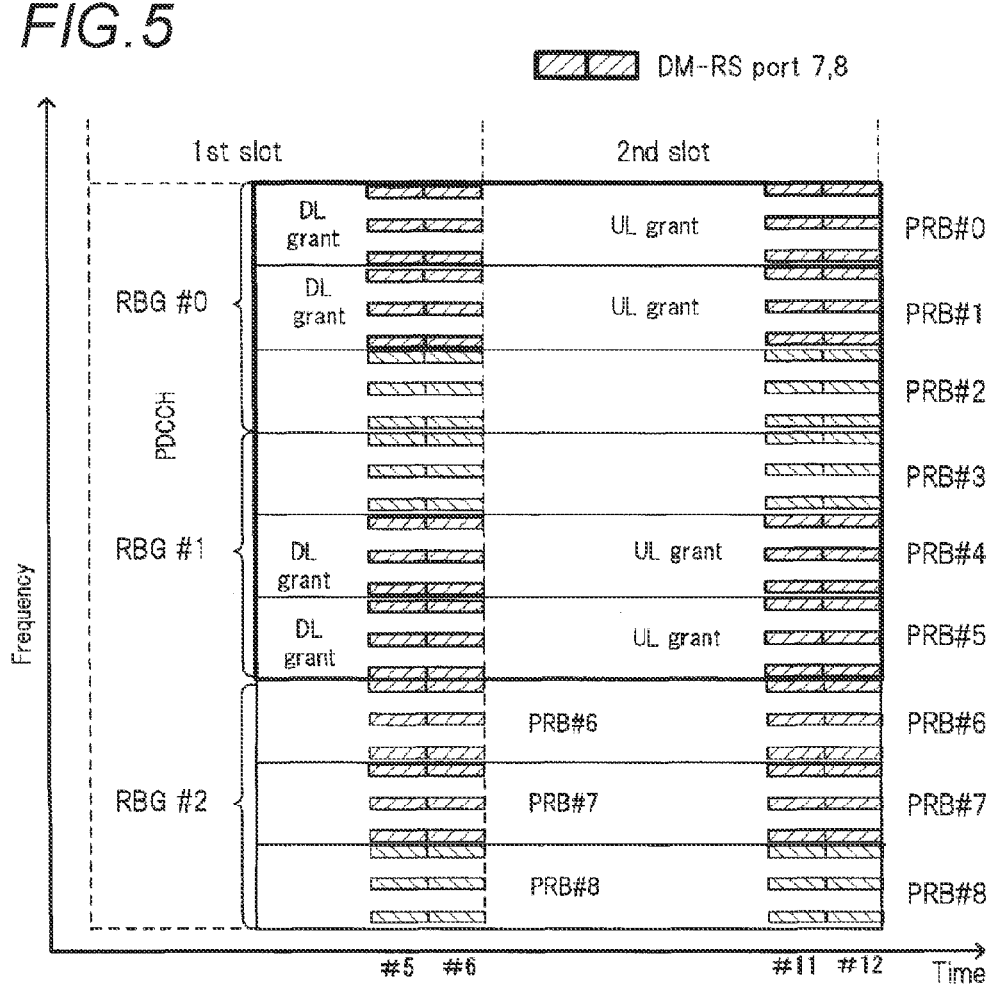
FIG. 5 is a diagram illustrating example (2) of "PRB bundling" allocated to R-PDCCH.
Figure 6:
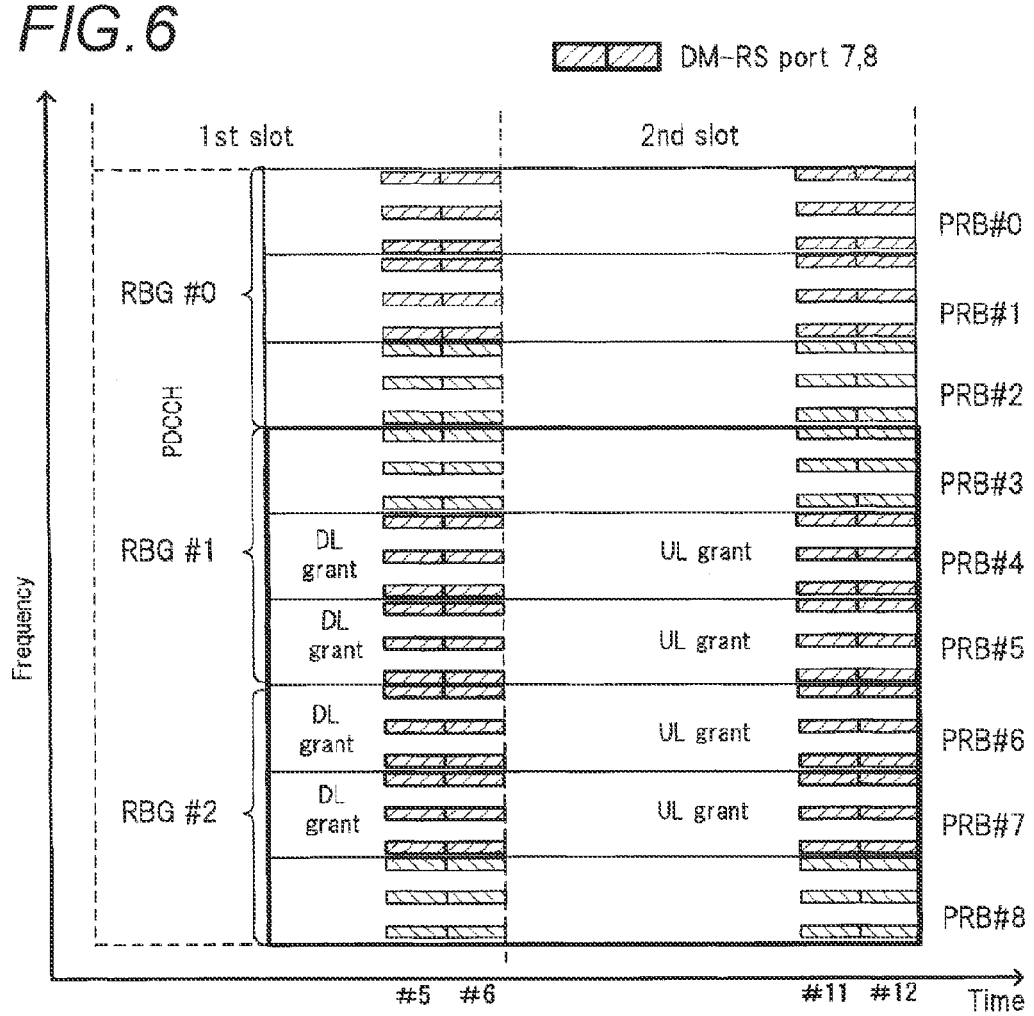
FIG. 6 is a diagram illustrating example (3) of "PRB bundling" allocated to R-PDCCH.

Referring to FIGS. 5 and 6, examples (2) and (3) of "PRB bundling" allocated to R-PDCCH will be described. If the aggregation size of R-PDCCH is 4, the base station 100 transmits R-PDCCH using four PRBs. In the examples (2) and (3) illustrated in FIGS. 5 and 6, the base station 100 arranges R-PDCCH in two sets of two PRBs that are targeted for PRB bundling among PRBs included, in the RBG.

As shown in FIG. 5, if RBG #0 and RBG #1 are designated as the search space, the base station 100 arranges R-PDCCH for relay station 200 in PRB #0, #1 having small PRB numbers in RBG#0 and in PRB #4 and PRB #5 having large PRB numbers in RBG #1. R-PDCCH includes "DL grant" that instructs data allocation of DL and "UL grant" that instructs data allocation of UL. Further, DM-RS (inscribed, as DM-RS port 7, 8 in FIG. 5) that is used for the channel estimation is arranged in two rear symbols (OFDM symbol #5, #6 and OFDM symbol #11, #12) of each slot. Accordingly, in the example illustrated in FIG. 5, the relay station 200, in consideration of decoding delay, may perform channel estimation with respect to "DL grant" that instructs the data allocation of the downlink of R-PDCCH by DM-RS of PRB #0 and PRB #1 included in RBG #0 and PRB #4 and PRB #5 included in RBG #1.

Figure 8:
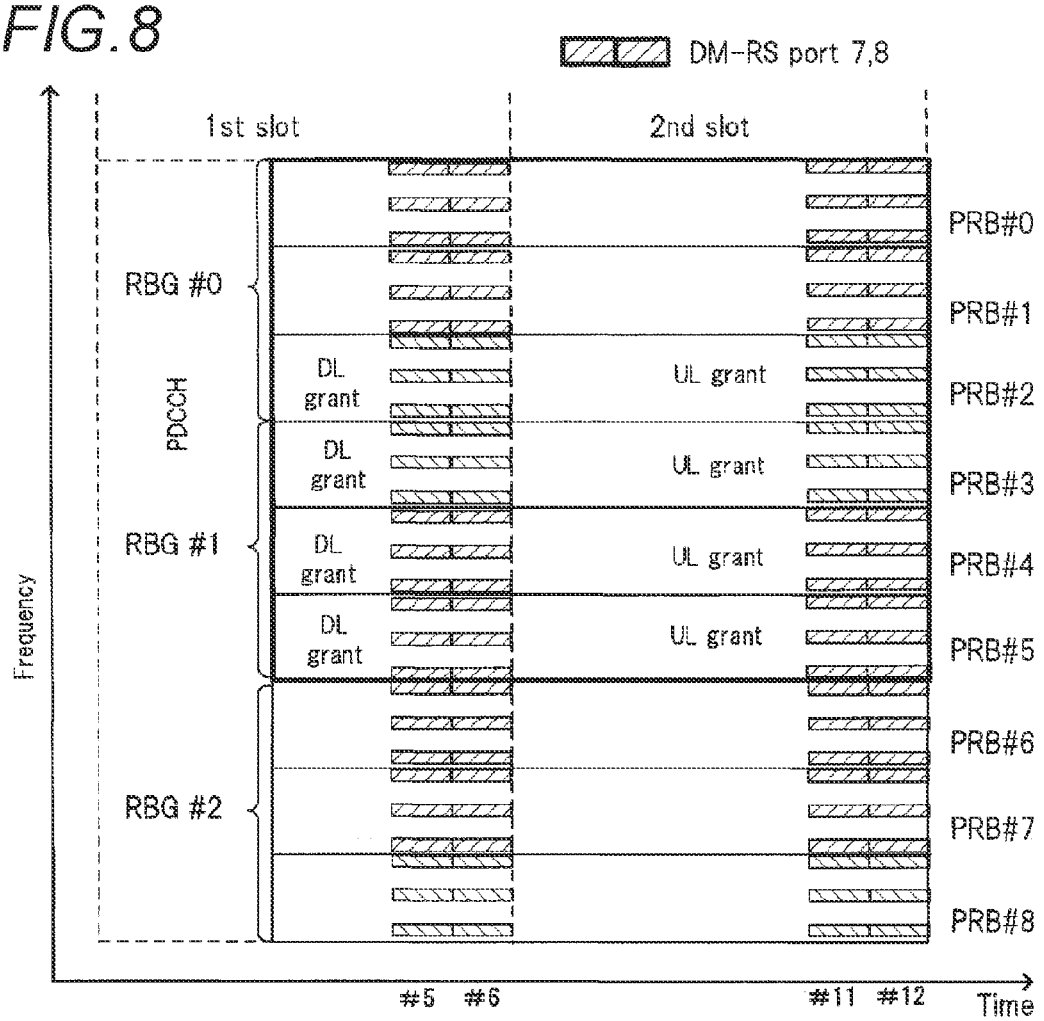
FIG. 8 is a diagram illustrating example (5) of "PRB bundling" allocated to R-PDCCH.

As shown in FIG. 8, if RBG #1 and RBG #2 are designated as the search space, the base station 100 arranges R-PDCCH for relay station 200 in PRB #4, #5 having large PRB numbers in RBG #1 and in PRB #6 and PRB #7 having small PRB numbers in RBG #2. R-PDCCH includes "DL grant" that instructs data allocation of DL and "UL grant" that instructs data allocation of UL. Further, DM-RS (inscribed as DM-RS port 7, 8 in FIG. 6) that is used for the channel estimation is arranged in two rear symbols (OFDM symbol #5, #6 and OFDM symbol #11, #12) of each slot. Accordingly, in the example illustrated in FIG. 6, the relay station 200, in consideration of decoding delay, may perform channel estimation with respect to "DL grant" that instructs the data allocation of the downlink of R-PDCCH by DM-RS of PRB #4 and PRB #5 included in RBG #1 and PRB #6 and PRB #7 included in RBG #2.

As described above with reference to FIGS. 5 and 6, if the relay station 200 receives R-PDCCH of aggregation size 4 in a state where the base station 100 determines the PRB of which the relay station 200 performs blind decoding in advance, the relay station 200 can perform channel estimation that the same precoding has been taken between DM-RS arranged in two adjacent PRBs. Accordingly, in the communication system according to this embodiment, the channel estimation accuracy of the relay station 200 can be improved. In the communication system according to this embodiment, particularly in comparison to the example illustrated in FIG. 31, the channel estimation accuracy of the relay station 200 can be improved with respect to "DL grant" that instructs data allocation of the downlink of R-PDCCH.

Further, in the communication system according to this embodiment, it is determined that four of the six PRBs of two RBGs are determined as PRBs in which R-PDCCH is arranged. Accordingly, in the communication system according to this embodiment, in comparison to the case where the relay station 200 performs blind decoding with respect to all combinations of selecting four from six PRBs included in the RBG, the number of blind decoding that is performed by the relay station 200 can be reduced.

Further, since the relay station 200 performs the blind decoding with respect to the plural aggregation sizes, in the communication system according to this embodiment, PRBs of which the relay station 200 performs blind decoding, for example, if the base station 100 is determined as shown in FIGS. 5 and 6, the PRB of which the relay station 200 performs blind decoding by aggregation size 2 and the PRB of which the relay station 200 performs blind decoding by aggregation size 4 may partially overlap (be commonized) (PRB #4, #5). Accordingly, in the communication system according to this embodiment, in the relay station 200, the channel estimation result of the overlapping PRB can be commonly used even if the aggregation size is changed, and thus the number of reception processes of DM-RS can be reduced.

Next, referring to FIGS. 7 and 8, examples (4) and (5) of "PRB bundling" allocated to R-PDCCH will be described. If the aggregation size of R-PDCCH is 4, the base station 100 transmits R-PDCCH using four PRBs.

Figure 7:
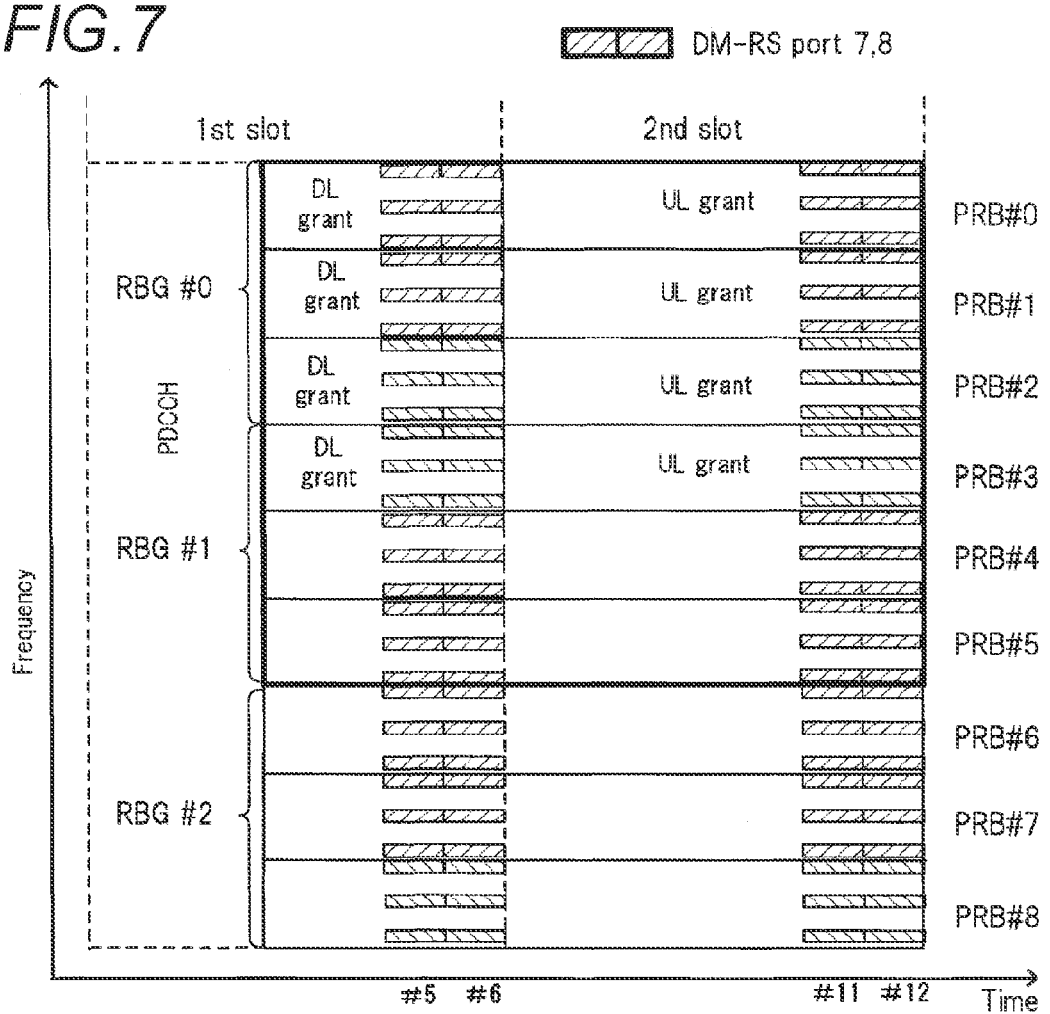
FIG. 7 is a diagram illustrating example (4) of "PRB bundling" allocated to R-PDCCH.

As shown in FIG. 7, if RBG #0 and RBG #1 are designated as the search space, the base station 100 may arrange R-PDCCH for relay station. 200 in four successive PRBs including PRB #0, #1, #2 of RBG #0 and PRB #3 of RBG #1. R-PDCCH includes "DL grant" that instructs data allocation of DL and "UL grant" that instructs data allocation of UL. Further, DM-RS (inscribed, as DM-RS port 7, 8 in FIG. 7) that is used for the channel, estimation is arranged in two rear symbols (OFDM symbol #5, #6 and OFDM symbol #11, #12) of each slot.

Further, as shown in FIG. 8 if RBG #0 and RBG #1 are designated as the search space, the base station 100 may arrange R-PDCCH for relay station 200 in four successive PRBs including PRB #2 of RBG #0 and PRB #3,4,5 of RBG #1. R-PDCCH includes "DL grant" that instructs data allocation of DL and "UL grant" that instructs data allocation of UL. Further, DM-RS (inscribed as DM-RS port 7, 8 in FIG. 8) that is used for the channel estimation is arranged in two rear symbols (OFDM symbol #5, #8 and OFDM symbol #11, #12) of each slot.

As described above with reference to FIGS. 7 and 8, if the base station 100 arranges R-PDCCH for four PRB relay stations 200, two PRBs (for example, PRB #4,5 in FIG. 7) that have not been used for R-PDCCH are included in the same RBG (for example, RBG #1). Accordingly, it becomes easy for the base station 100 to arrange R-PDCCH for other relay stations except for the relay station 200 in the two PRBs (for example, in FIG. 7, PRB #4, 5) that are not used for R-PDCCH. This is because if resource allocation (type 1) in the unit of a PRB is performed in the case of a bandwidth in which the RBG unit is equal to or more than 2, there is a limit that the PRB is not allocated to the adjacent RBG.

(In the Case of Aggregation Size 8)

Figure 9:
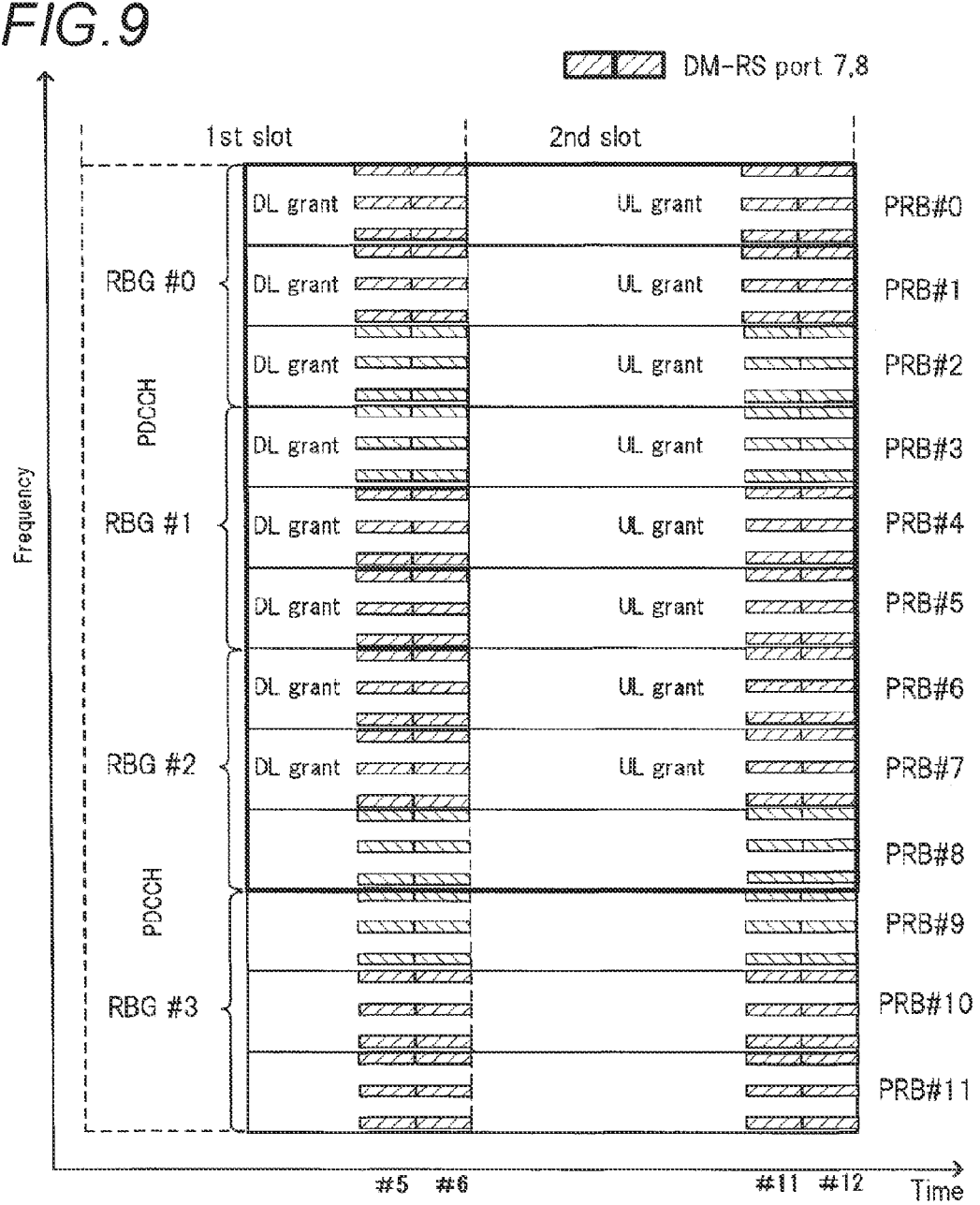
FIG. 9 is a diagram illustrating example (6) of "PRB bundling" allocated to R-PDCCH.
Figure 10:
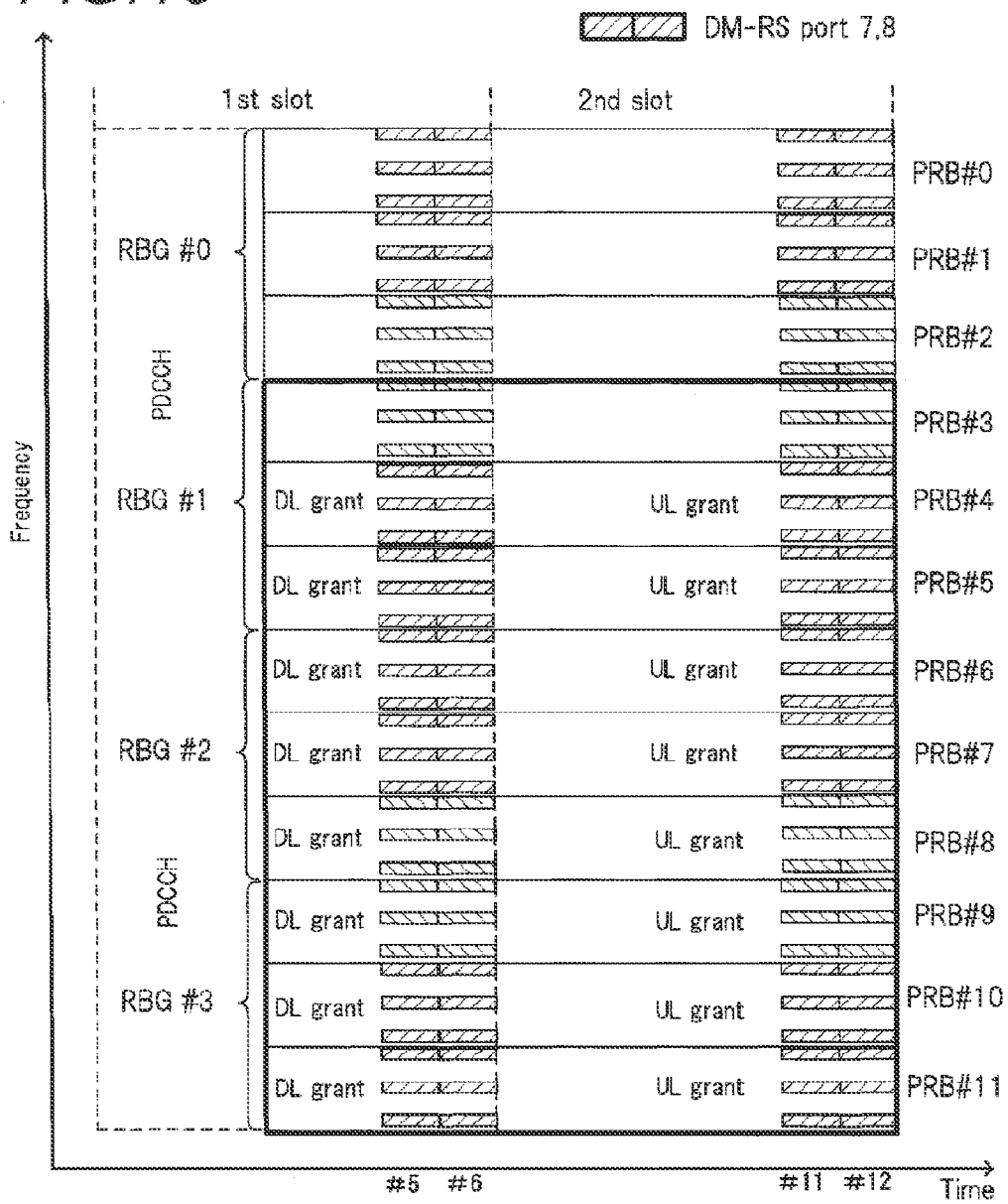
FIG. 10 is a diagram illustrating example (7) of "PRB bundling" allocated, to R-PDCCH.

Referring to FIGS. 9 and 10, examples (6) and (7) of "PRB bundling" allocated to R-PDCCH will be described. If the aggregation size of R-PDCCH is 8, the base station 100 transmits R-PDCCH using eight PRBs. In the examples (6) and (7) illustrated in FIGS. 9 and 10, the base station 100 arranges R-PDCCH in four sets of two PRBs that are targeted for PRB bundling among PRBs included in the RBG.

As shown in FIG. 9, if RBG #0, RBG #1, and RBG #2 are designated as the search space, the base station 100 arranges R-PDCCH for relay station 200 in PRB #0, #1, #2 included in RBG #0, PRB #3, #4, #5 included in RBG #1, and PRB #6, #7 included in RBG #2. R-PDCCH includes "DL grant" that instructs data allocation of DL and "UL grant" that instructs data allocation of UL, Further, DM-RS (inscribed as DM-RS port 7, 8 in FIG. 9) that is used for the channel estimation is arranged in two rear symbols (OFDM symbol #5, #6 and OFDM symbol #11, #12) of each slot. Accordingly, in the example illustrated, in FIG. 9, the relay station 200, in consideration of decoding delay, may perform channel estimation with respect to "DL grant" that instructs the data allocation of the downlink of R-PDCCH by DM-RS of PRB #0, #1, #2 included in RBG #0, PRB #3, #4, #5 included in RBG #1, and PRB #6, #7 included in RBG #2.

As shown in FIG. 10, if RBG #1, RBG #2, and RBG #3 are designated as the search space, the base station 100 arranges R-PDCCH for relay station 200 in PRB #4, #5 included in RBG #1, PRB #6, #7, #8 included, in RBG #2, and PRB #9, #10, #11 included in RBG #3. R-PDCCH includes "DL grant" that instructs data allocation of DL and "UL grant" that instructs data, allocation of UL. Further, DM-RS (inscribed as DM-RS port 7, 8 in FIG. 10) that is used for the channel estimation is arranged in two rear symbols (OFDM symbol #5, #6 and OFDM symbol #11, #12) of each slot. Accordingly, in the example illustrated in FIG. 10, the relay station 200, in consideration of decoding delay, may perform channel estimation with respect to "DL grant" that instructs the data allocation of the downlink of R-PDCCH by DM-RS of PRB #4, #5 included in RBG #1, PRB #6, #7, #8 included in RBG #2, and PRB #9, #10, #11 included in RBG #3.

As described above with reference to FIGS. 9 and 10, if the relay station 200 receives R-PDCCH of aggregation size 8 in a state where the base station 100 determines the PRB of which the relay station 200 performs blind decoding in advance, the relay station 200 can perform channel estimation that the same preceding has been taken between DM-RS arranged in two adjacent PRBs. Accordingly, in the communication system according to this embodiment, the channel estimation accuracy of the relay station 200 can be improved. In the communication system according to this embodiment, particularly in comparison to the example illustrated in FIG. 31, the channel estimation accuracy of the relay station 200 can be improved with respect to "DL grant" that instructs data allocation of the downlink of R-PDCCH.

Further, in the communication system according to this embodiment, it is determined that eight of the nine PRBs of three RBGs are determined as PRBs in which R-PDCCH is arranged. Accordingly, the relay station 200 may perform blind decoding with respect to a combination of eight adjacent PRBs for which the same preceding has been taken. Through this, in the communication system according to this embodiment, in comparison to the case where the relay station 200 performs blind decoding with respect to all combinations of selecting eight from nine PRBs included in the RBG, the number of blind decoding that is performed by the relay station 200 can be reduced.

(In the Case of Aggregation Size 1)

Referring to FIGS. 11 to 14, examples (8) and (11) of "PRB bundling" allocated to R-PDCCH will, be described. If the aggregation size of R-PDCCH is 1, the base station 100 transmits R-PDCCH using only one PRB. The base station 100 arranges R-PDCCH in one of two PRBs that are targeted for PRB bundling among PRBs included in the RBG.

As shown in FIG. 11, if RBG #0 is designated as the search space, the base station 100 arranges R-PDCCH for relay station 200 in PRB #1 of two PRBs, that is, PRB #0, #1, which are targeted for PRB bundling, included in RBG #0. R-PDCCH includes "DL grant" that instructs data allocation of DL and "UL grant" that instructs data allocation of UL. Further, DM-RS (inscribed as DM-RS port 7, 8 in FIG. 11) is used, for the channel estimation is arranged in two rear symbols (OFDM symbol #5, #8 and OFDM symbol #11, #12) of each slot. Accordingly, in the example illustrated in FIG. 11, the relay station 200, in consideration of decoding delay, may perform channel estimation with respect to "DL grant" that instructs the data allocation of the downlink of R-PDCCH by DM-RS of PRB #1 included in RBG #0.

Here, as shown in FIG. 11, if the base station 100 arranges R-PDCCH in PRB #1 included in RBG #0, R-PDCCH is not arranged in PRB #0 included in RBG #0. However, the same precoding as DM-RS of PRB #1 is taken with respect to DM-RS of PRB #0 included in RBG #0.

Further, as shown in FIG. 12, if RBG #0 is designated as the search space, the base station 100 may arrange R-PDCCH for relay station 200 in PRB #0 of two PRBs, that is. PRB #0, #1, which are targeted for PRB bundling, included in RBG #0. R-PDCCH includes "DL grant" that instructs data allocation of DL and "UL grant" that instructs data allocation of UL. Further, DM-RS (inscribed as DM-RS port 7, 8 in FIG. 12) that is used for the channel estimation is arranged in two rear symbols (OFDM symbol #5, #8 and OFDM symbol #11, #12) of each slot. Accordingly, in the example illustrated in FIG. 12, the relay station 200, in consideration of decoding delay, may perform channel estimation with respect to "DL grant" that instructs the data allocation of the downlink of R-PDCCH by DM-RS of PRB #0 included in RBG #0.

Figure 13:
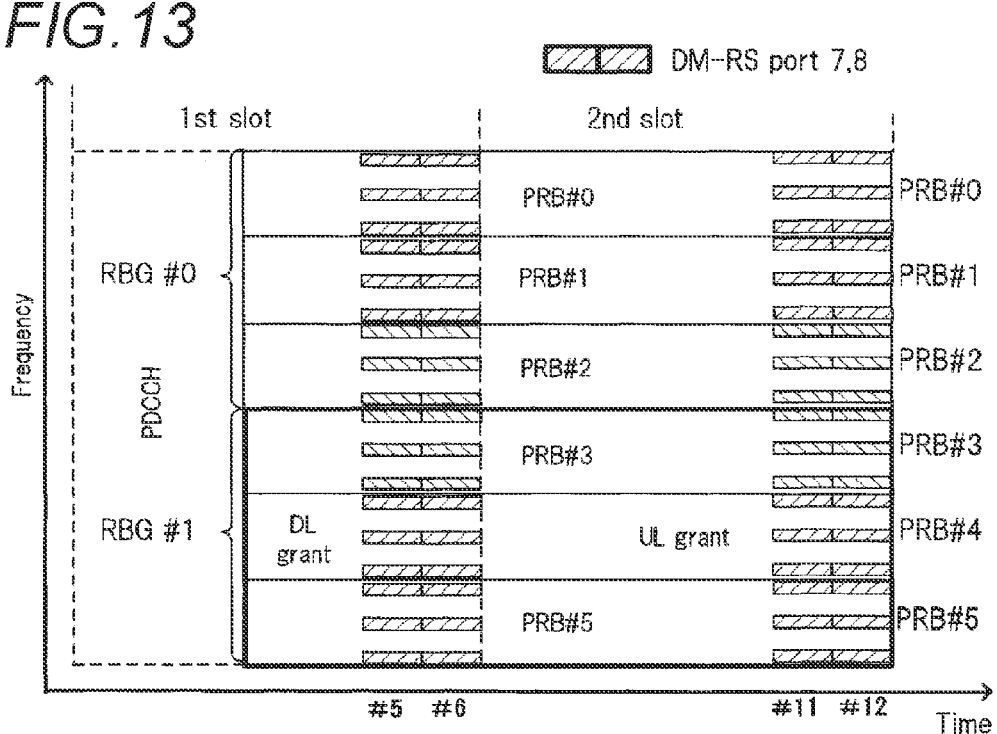
FIG. 13 is a diagram illustrating example (10) of "PRB bundling" allocated to R-PDCCH.

Further, as shown in FIG. 13, if RBG #1 is designated as the search space, the base station 100 may arrange R-PDCCH for relay station 200 in PRB #4 of two PRBs, that is, PRB #4, #5, which are targeted for PRB bundling, included in RBG #1. R-PDCCH includes "DL grant" that instructs data allocation of DL and "UL grant" that instructs data allocation of UL. Further, DM-RS (inscribed as DM-RS port 7, 8 in FIG. 13) that is used for the channel estimation is arranged in two rear symbols (OFDM symbol #5, #6 and OFDM symbol #11, #12) of each slot. Accordingly, in the example illustrated in FIG. 13, the relay station 200, in consideration of decoding delay, may perform channel estimation with respect to "DL grant" that instructs the data allocation of the downlink of R-PDCCH by DM-RS of PRB #4 included in RBG #1.

Figure 14:
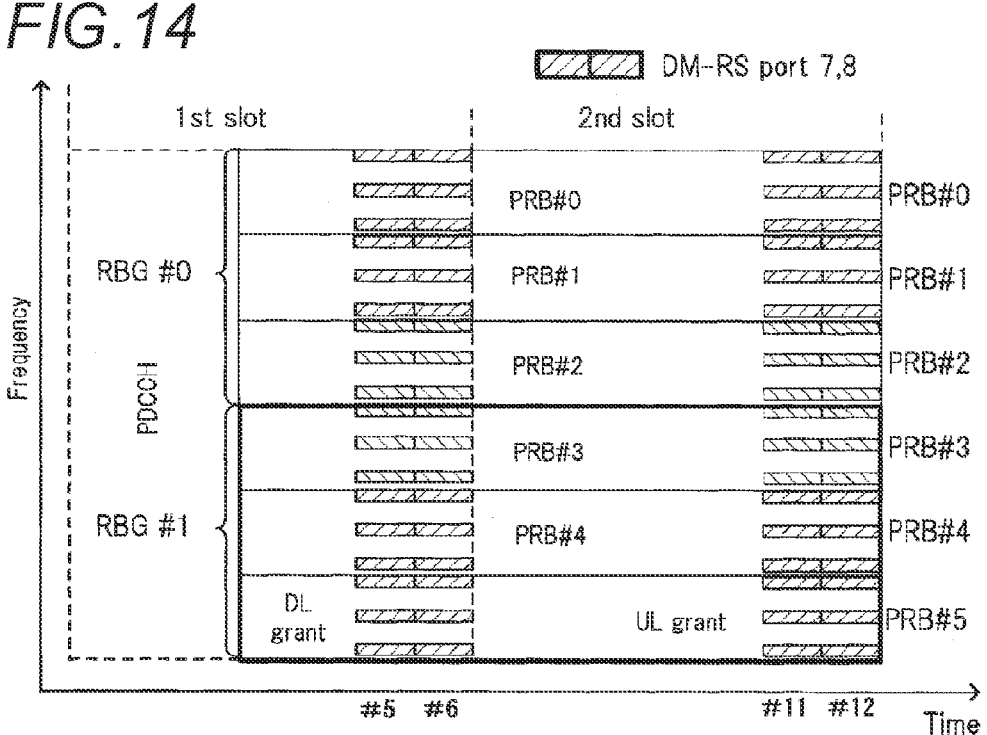
FIG. 14 is a diagram illustrating example (11) of "PRB bundling" allocated to R-PDCCH.

Further, as shown in FIG. 14, if RBG #1 is designated as the search space, the base station 100 may arrange R-PDCCH for relay station 200 in PRB #5 of two PRBs, that is, PRB #4, #5, which are targeted for PRB bundling, included in RBG #1. E-PDCCH includes "DL grant" that instructs data allocation of DL and "UL grant" that instructs data allocation of UL, Further, DM-RS (inscribed as DM-RS port 7,8 in FIG. 14) that is used, for the channel estimation is arranged, in two rear symbols (OFDM symbol #5, #6 and OFDM symbol #11, #12) of each slot. Accordingly, in the example illustrated in FIG. 14, the relay station 200, in consideration of decoding delay, may perform channel estimation with respect to "DL grant" that instructs the data allocation of the downlink of R-PDCCH by DM-RS of PRB #5 included in RBG #1.

As described above with reference to FIGS. 11 to 14, if the relay station 200 receives R-PDCCH of aggregation size 1 in a state where the base station 100 determines the PRB of which the relay station 200 performs blind decoding in advance, the relay station 200 can perform channel estimation that the same preceding has been taken between DM-RS arranged in adjacent PRBs. Accordingly, in the communication system according to this embodiment, the channel estimation accuracy of the relay station 200 can be improved. In the communication system according to this embodiment, particularly in comparison to the example illustrated, in FIG. 31, the channel estimation accuracy of the relay station 200 can be improved with respect to "DL grant" that instructs data allocation of the downlink of R-PDCCH.

Further, in the communication system according to this embodiment, the base station 100 may determine one or two PRBs, which arrange R-PDCCH, among three PRBs included in RBG. Accordingly, the relay station 200 may perform blind decoding with respect to a combination of one or two adjacent PRBs for which the same precoding has been taken. Through this, in the communication system according to this embodiment, in comparison to the ease where the relay station 200 performs blind decoding with, respect to all combinations of three PRBs included in the RBG, the number of blind decoding that is performed by the relay station 200 can be reduced.

[In the Case of RBG Size 4 and PEG Size 2]
(In the Case of Aggregation Size 2)

Figure 15:
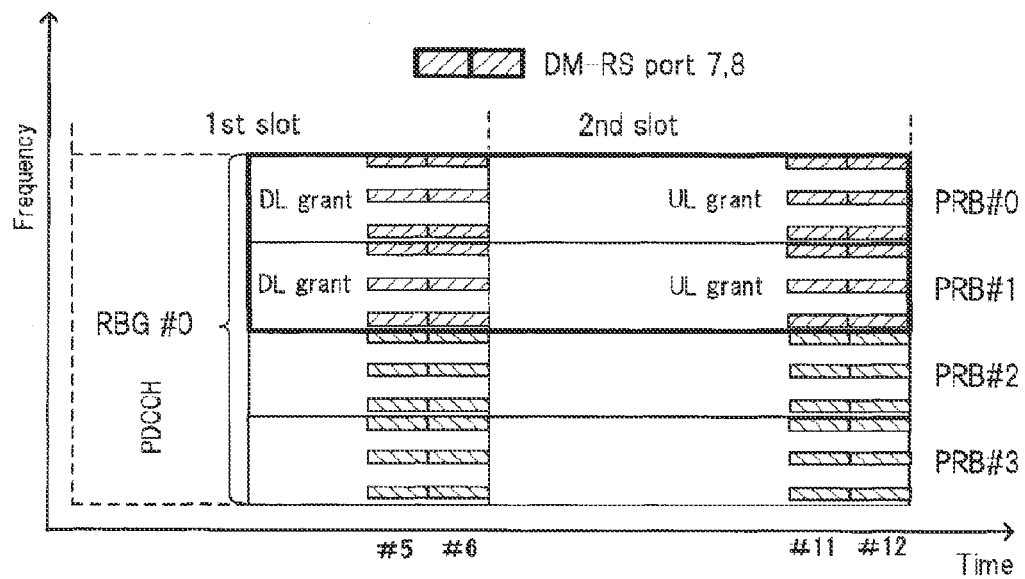
FIG. 15 is a diagram illustrating example (12) of "PRB bundling" allocated to R-PDCCH.
Figure 16:
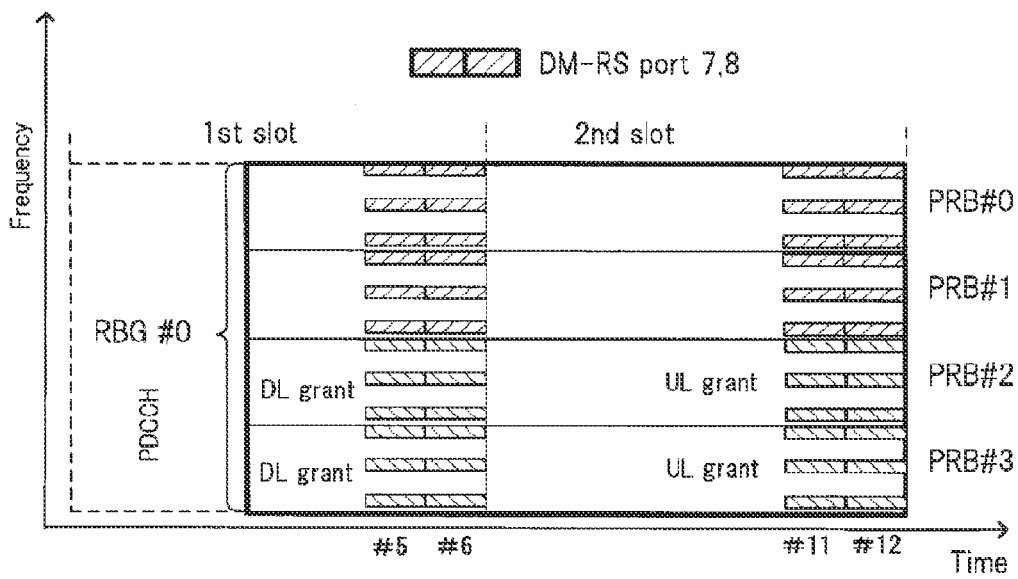
FIG. 16 is a diagram illustrating example (13) of "PRB bundling" allocated to R-PDCCH.

Referring to FIGS. 15 and 16, examples (12) and (13) of "PRB bundling" allocated to R-PDCCH will be described. If the aggregation size of R-PDCCH is 2, the base station 100 transmits R-PDCCH using two PRBs that are targeted for the same precoding.

As shown in FIG. 15, if RBG #0 is designated as the search space, the base station 100 arranges R-PDCCH for relay station 200 in PRB #0, #1 having small PRB numbers in RBG #0. In the ease of performing PRB bundling, PRB #0 and PRB #1 included in RBG #0 correspond to the same precoding. R-PDCCH includes "DL grant" that instructs data allocation of DL and "UL grant" that instructs data allocation of UL. Further, DM-RS (inscribed as DM-RS port 7, 8 in FIG. 15) that is used for the channel estimation is arranged in two rear symbols (OFDM symbol #5, #6 and OFDM symbol #11, #12) of each slot. Accordingly, in the example illustrated in FIG. 15, the relay station 200, in consideration of decoding delay, may perform channel estimation with respect to "DL grant" that instructs the data allocation of the downlink of R-PDCCH by DM-RS of PRB #2 and PRB #3 included in RBG #0.

As shown in FIG. 16, if RBG #0 is designated as the search, space, the base station 100 arranges R-PDCCH for relay station 200 in PRB #2, #3 of PRB numbers in RBG #0. PRB #2 and PRB #3 included in RBG #0 correspond to the same precoding. R-PDCCH includes "DL grant" that instructs data allocation of DL and "UL grant" that instructs data allocation of UL. Further, DM-RS (inscribed as DM-RS port 7, 8 in FIG. 16) that is used, for the channel estimation is arranged, in two rear symbols (OFDM symbol #5, #6 and OFDM symbol #11, #12) of each slot. Accordingly, in the example illustrated in FIG. 16, the relay station 200, in consideration of decoding delay, may perform channel estimation with respect to "DL grant" that instructs the data allocation of the downlink of R-PDCCH by DM-RS of PRB #2 and PRB #3 included in RBG #0.

[In the Case of RBG Size 3 and PRG Size 3]
(In the Case of Aggregation Size 4)

Figure 17:
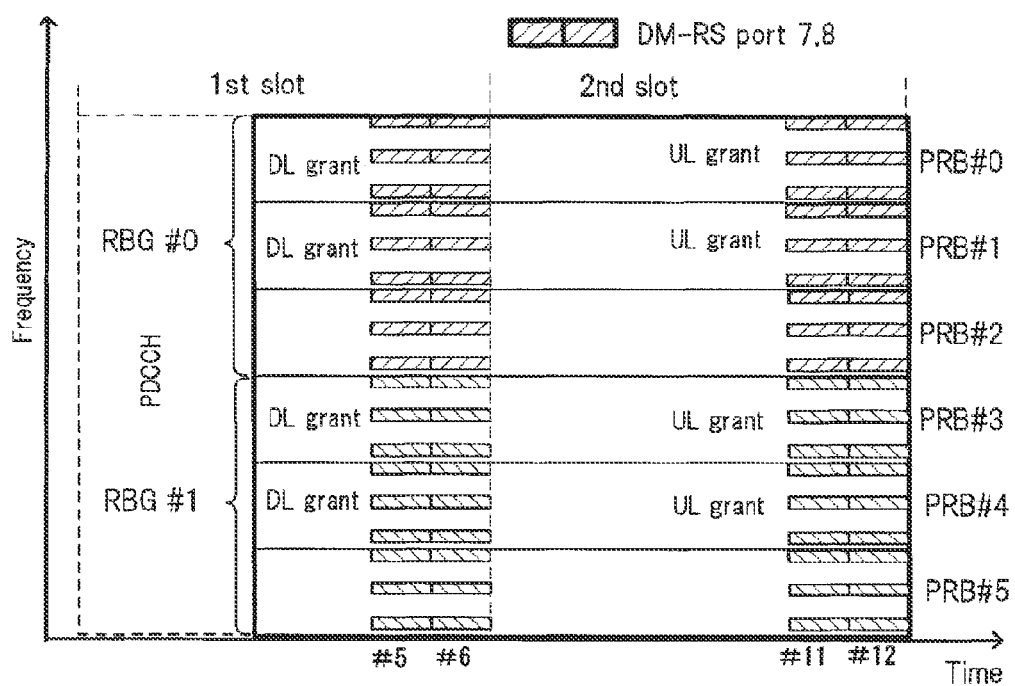
FIG. 17 is a diagram illustrating example (14) of "PRB bundling" allocated to R-PDCCH.

Referring to FIG. 17, an example (14) of "PRB bundling" allocated to R-PDCCH will be described. Here, if the aggregation size of R-PDCCH is 4, the base station transmits R-PDCCH using four PRBs in two RBGs. If the PRG size is 3, all the three PRBs included in the RBG are allocated to the same relay station, and the base station transmits R-PDCCH through the same precoding. If RBG #0 and RBG #1 are designated as the search space and the base station transmits R-PDCCH using three PRBs of RBG #0 and one PRB of RBG #1, the relay station performs channel estimation using only DM-RS of one PRB in RBG #1. This is because there is a possibility that two PRBs of RBG #1 that is not used for R-PDCCH are allocated to other relay stations except for the relay station to which R-PDCCH is transmitted, and in this case, another preceding is taken as the preceding of DM-RS.

Accordingly, in this embodiment, as shown in FIG. 17, in the case where the aggregation size is 4, the relay station 200 arranges R-PDCCH for relay station 200 by two PRBs for each RBG. As shown in FIG. 17, if RBG #0 and RBG #1 are designated as the search space, the base station 100 arranges R-PDCCH for relay station 200 in two PRBs (PRB #0,1) in RBG #0 and two PRBs (PRB #3,4) in RBG #1. R-PDCCH includes "DL grant" that instructs data allocation of DL and "UL grant" that instructs data allocation of UL. Further, DM-RS (inscribed as DM-RS port 7, 8 in FIG. 17) that is used for the channel estimation is arranged in two rear symbols (OFDM symbol #5, #6 and OFDM symbol #11, #12) of each slot. Accordingly, in the example illustrated in FIG. 17, the relay station. 200, in consideration of decoding delay, may perform channel estimation with respect to "DL grant" that instructs the data allocation of the downlink of R-PDCCH by DM-RS of PRB #0 and PRB #1 included in RBG #0 and PRB #3 and PRB #4 included in RBG #1.

Figure 18:
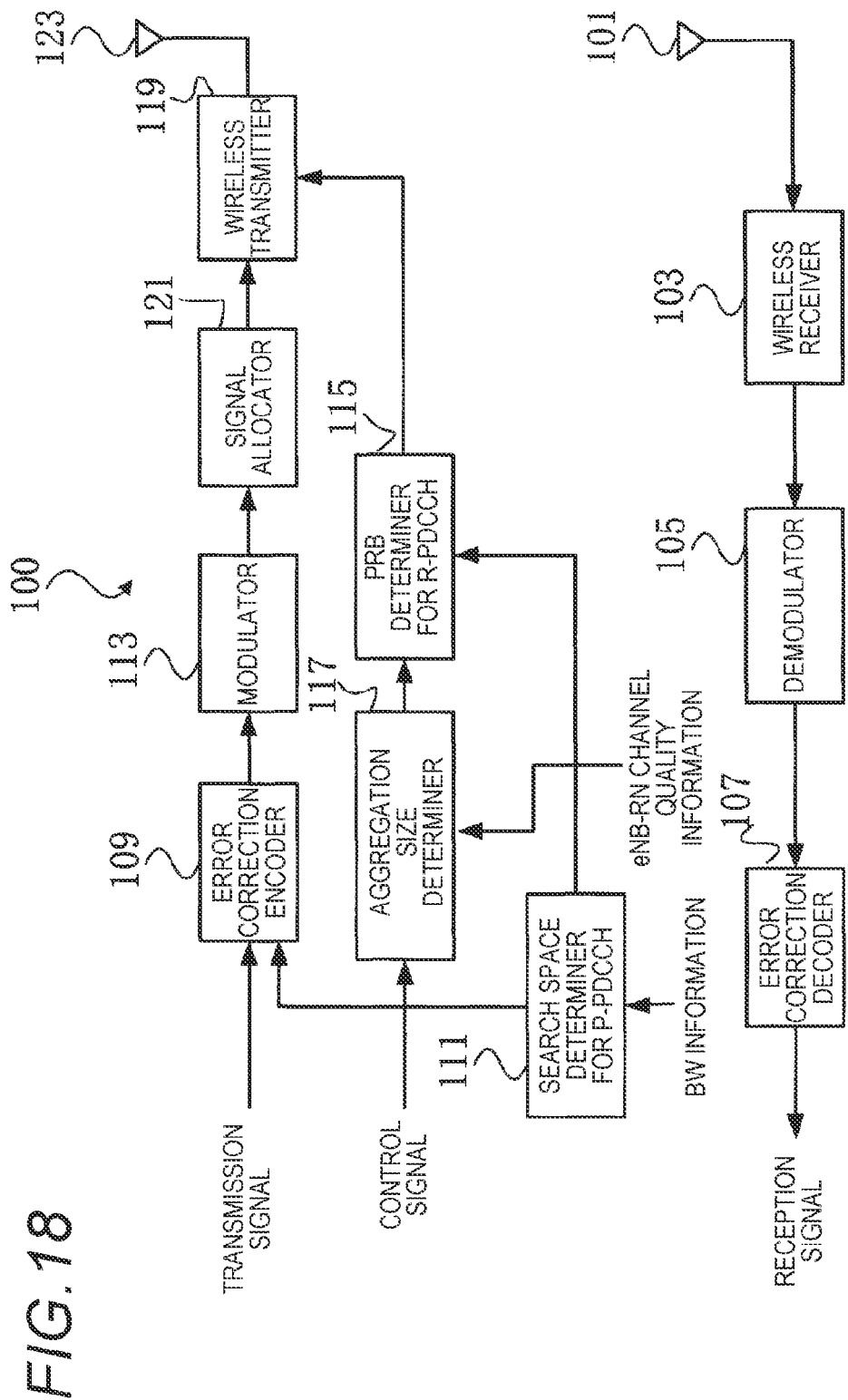
FIG. 18 is a block diagram illustrating the configuration of a base station 100.

Next, referring to FIG. 18, the configuration of the base station 100 will be described. FIG. 18 is a block diagram of the base station 100. The base station 100 illustrated in FIG. 18 includes a reception antenna 101, a wireless receiver 103, a demodulator 105, an error correction decoder 107, an error correction encoder 109, a search space determiner 111 for R-PDCCH, a modulator 113, a PRB determiner 115 for R-PDCCH, an aggregation size determiner 117, a wireless transmitter 119, a signal allocator 121, and a transmission antenna 123.

The wireless receiver 103 receives a signal from the relay station 200 through the reception antenna 101, performs wireless processing such as down conversion and the like, and outputs the processed signal to the demodulator 105.

The demodulator 105 demodulates the signal input from the wireless receiver 103 and outputs the demodulated signal to the error correction decoder 107.

The error correction decoder 107 decodes the signal input from the demodulator 105 and outputs a reception signal.

The error correction encoder 109 inputs a transmission signal and search space information of R-PDCCH input from the search space determiner 111 for R-PDCCH, performs error-correction-encoding of the transmission signal to output the transmission signal to the modulator 113. Accordingly, the search space information of R-PDCCH is information that indicates a candidate of a resource area that transmits a control signal (R-PDCCH) for relay station 200 based on system bandwidth information (BW information). Further the search space information is generated in the unit of an RBG or in the unit of a FEB.

The search space determiner 111 for R-PDCCH generates a PRB bundling group size (PEG size) and an RBG size based, on the system, bandwidth information (BW information). Further, the search space determiner 111 for R-PDCCH determines the search space as the candidate of the resource area that transmits a control signal (R-PDCCH) for relay station 200 and generates the search space information of R-PDCCH. Then, the search space determiner 111 for R-PDCCH outputs the generated search space information for R-PDCCH to the error correction encoder 109. Further, the search space determiner 111 for R-PDCCH outputs the PRB bundling size, the RBG size, and the generated, search space information to the PRB determiner 115 for R-PDCCH.

The aggregation size determiner 117 determines the aggregation size of the control signal according to channel quality information between the subject station and the relay station 200 (eNB-RN channel quality information). The aggregation size determiner 117 encodes the control signal according to the determined aggregation size and outputs the encoded control, signal to the PRB determiner 115 for R-PDCCH.

The PRB determiner 115 for R-PDCCH determines the PRB, which actually transmits R-PDCCH, among the PRBs included in the search space for R-PDCCH from the R-PDCCH aggregation size, the channel quality information between the subject station and the relay station 200, the search space information, and the RBG size. Further, the RPB determiner 115 for R-PDCCH selects the PRB, which is targeted for PRB bundling, among the PRBs included in the search space and allocates R-PDCCH to the selected PRB. That is, the PRB determiner 115 for R-PDCCH also functions as an allocator that selects the PRB, which is targeted for PRB bundling, among the PRBs included in the search, space, and allocates R-PDCCH that is the control signal for relay station 200 to the selected PRB. The R-PDCCH allocated to the PRB is preceded for each PRG and is output to the wireless transmitter 119. Further, the DM-RS is also preceded, for each PRG and is output to the wireless transmitter 119.

The modulator 113 modulates the transmission signal and outputs the modulated transmission signal to the signal allocator 121.

The signal allocator 121 allocates the transmission signal input from the modulator 113 to the resource and outputs the transmission signal to the wireless transmitter 119.

The wireless transmitter 119 performs wireless processing, such as up conversion and the like, with respect to the transmission signal allocated to the resource through the signal allocator 121, and transmits the transmission signal from the transmission antenna 123 to the relay station 200.

Figure 19:
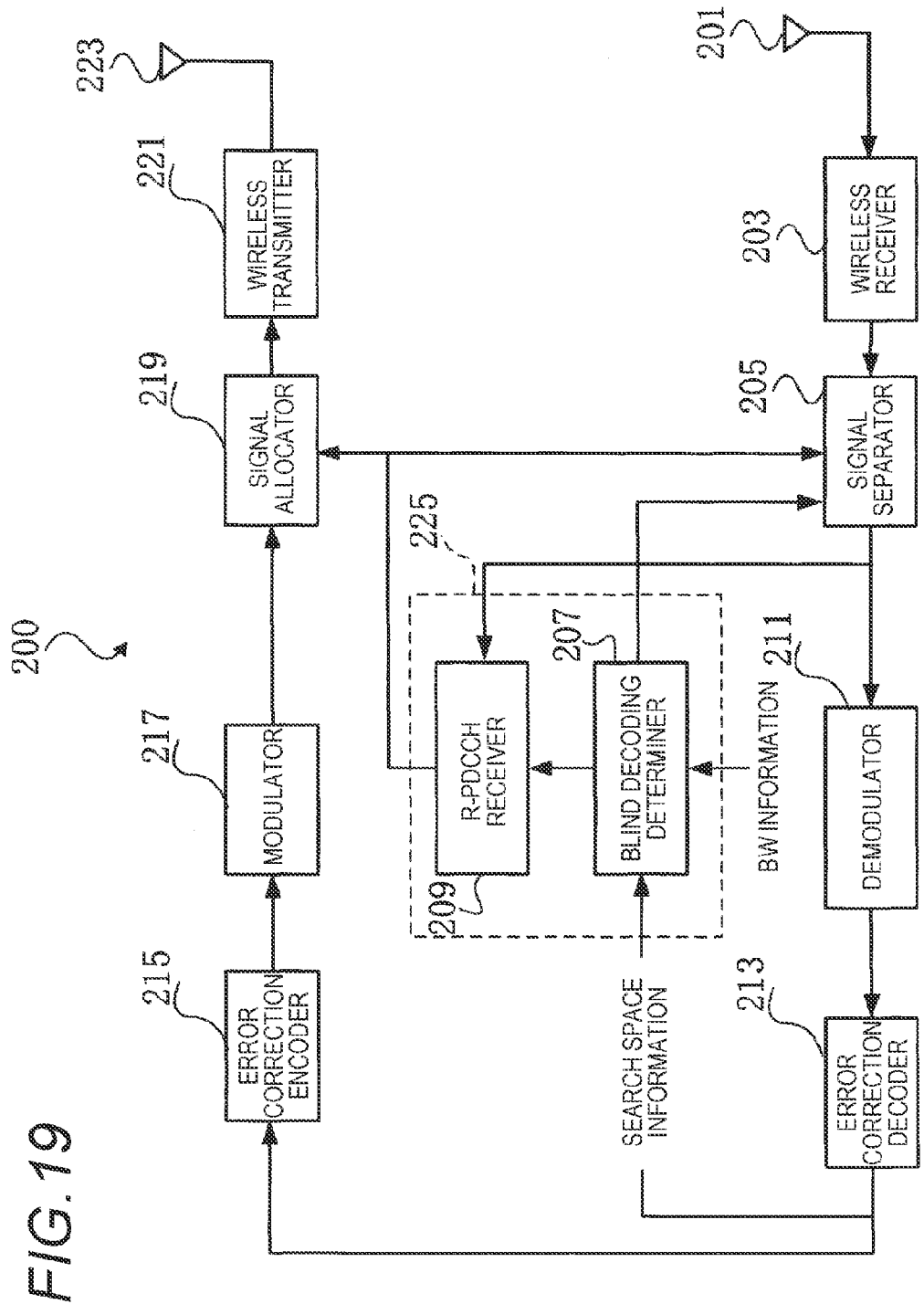
FIG. 19 is a block diagram illustrating the configuration of a relay station 200.

Next, referring to FIG. 19, the configuration of the relay station 200 will be described. FIG. 19 is a block diagram of the relay station 200. The relay station 200 illustrated, in FIG. 19 includes a reception antenna 201, a wireless receiver 203, a signal separator 205, a blind decoding determiner 207, an R-PDCCH receiver 209, a demodulator 211, an error correction decoder 213, an error correction encoder 215, a modulator 217, a signal allocator 219, a wireless transmitter 221, and a transmission antenna 223. Further, the blind decoding determiner 207 and the R-PDCCH receiver 209 constitute a blind decoder 225.

The wireless receiver 203 receives a signal from the base station 100 through the reception antenna 201, performs wireless processing such as down conversion and the like, and outputs the processed signal to the signal separator 205.

The signal separator 205 separates a signal to be blind-decoded from the reception signal input from the wireless receiver 203 based on blind decoding information input from the blind decoding determiner 207. The separated, signal, to be blind-decoded is output to the R-PDCCH receiver 209. Further, the signal separator 205 separates data for relay station instructed from the R-PDCCH receiver 209 and outputs the separated data for relay station to the demodulator 211.

The demodulator 211 demodulates the signal input from the signal separator 205 and outputs the demodulated, signal to the error correction decoder 213.

The error correction decoder 213 decodes the signal input from the demodulator 211, outputs R-PDCCH search space information included in the decoded signal to the blind decoding determiner 207, and outputs the reception signal to the error correction encoder 215.

If the R-PDCCH search space information (R-PDCCH allocation information) is in the unit of an RBG, the blind decoding determiner 207 generates the RBG size and the PRB bundling size rather than the system bandwidth information (BW information). Further, the blind decoding determiner 207 generates blind decoding information by determining the PRB to be blind-decoded, among the PRBs included, in the search space for each aggregation size, and outputs the generated blind, decoding information to the signal separator 205 and the R-PDCCH receiver 209. Further, the blind decoding determiner 207 constitutes a part of the blind decoder 225.

Here, the blind, decoding information is information that indicates the PRB to be blind-decoded among the PRBs included in the search space, and is changed depending on the aggregation size. The PRB to be blind-decoded is the PRB in which R-PDCCH for the subject station is arranged.

The R-PDCCH receiver 209 detects R-PDCCH by performing blind decocting based on the blind decoding information. "DL grant" included in R-PDCCH is output to the signal separator 205 and "UL grant" included in R-PDCCH is output to the signal allocator 219. Further, the R-PDCCH receiver 209 constitutes a part of the blind decoder 225.

The error correction encoder 215 performs error correction encoding with respect to the signal that is error-correction-decoded by the error correction decoder 213, and outputs the error-correction-encoded signal to the modulator 217.

The signal allocator 219 allocates the signal according to "UL grant" output from the R-PDCCH receiver and outputs the allocated signal to the wireless transmitter 221.

The wireless transmitter 221 performs wireless processing, such as up-conversion, with respect to the allocated signal and transmits the processed, signal, from the transmission antenna 223 to the base station 100.

Further, in the communication system according the embodiment, the PRG size illustrated in FIG. 2 is used, but the PRB size is not limited thereto. In the communication system according to this embodiment, the influence of the frequency selectivity fading is uniform while the SNR of the reference signal is heightened, and in order to set a good beam, the PRG size may be properly changed with respect to the system bandwidth.

Embodiment 2

In a communication system according to embodiment 2, a base station 300 arranges R-PDCCH of aggregation size 2, of which a relay station 400 performs blind decoding, among plural physical resource blocks (PRBs) that constitute RBG in the PRB that constitutes the same resource block group (RBG). Through this arrangement, the number of RBGs occupied by R-PDCCH of aggregation size 2 becomes "1", and thus the number of RBGs that can be allocated to (R-) PDSCH of a mobile station or the relay station 400 is increased.

It is considered that R-PDCCH search space is allocated to VRB (Virtual Resource Block) through a logic channel and then allocated to PRB through a physical channel. Even in this case, the number of RBGs that are used in R-PDCCH is changed by the selected PRB.

Figure 20:
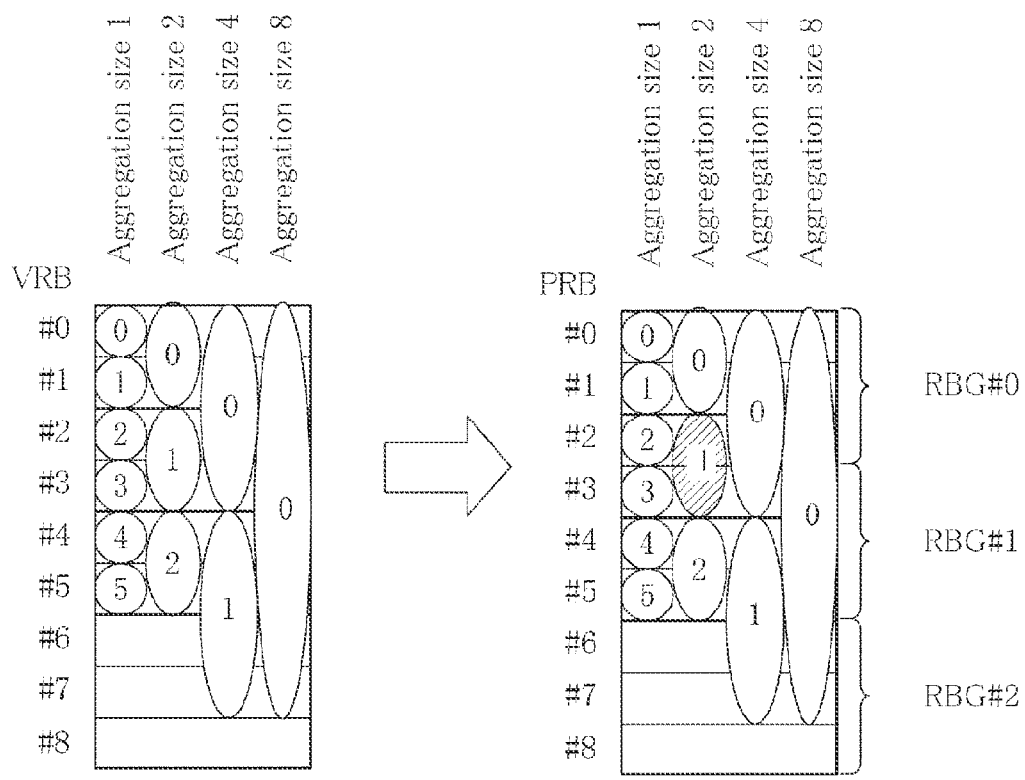
FIG. 20 is a diagram illustrating an example in which, a search space of R-PDCCH is allocated from VRB to PRB.

Referring to FIG. 20, an example in which a search space of R-PDCCH is allocated, from the VRB that is allocated through the logic channel to the PRB through a physical channel.

As shown in FIG. 20, in the VRB, the search space of R-PDCCH of aggregation size 1 corresponds to VRB #0 to #5, and the search space of R-PDCCH of aggregation size 2 corresponds to VRB #0 to #5. Further, in the case of the aggregation size 2, VRB #0 and VRB #1 constitute a set, BRB #2 and VRB #3 constitute a set, and VRB #4 and VRB #5 constitute a set.

Here, the set indicates a unit for transmitting one R-PDCCH. That is, in FIG. 20, the set of VRB #0 and VRB #1 of aggregation size 2 shown as ellipses indicates that one R-PDCCH is transmitted through 2RB. Further, numbers in circles or ellipses in FIG. 20 indicate the set numbers. Hereinafter, the set number is represented by set #n. That is, in the case where the set number is 1, it is represented by set #1.

As shown in FIG. 20, the search space of R-PDCCH of aggregation size 4 corresponds to VRB #0 to #7, and in aggregation size 4, VRB #0 to VRB #3 are set to set #0 and VRB #4 to VRB #7 are set to set #1. Further, the search space of R-PDCCH of aggregation size 8 corresponds to VRB #0 to #7, and VRB #0 to VRB #7 are set to set #0. Accordingly, in aggregation size 1, a candidate which transmits R-PDCCH of six sets (set #0 to set #8) is prepared, and in aggregation size 2, a candidate which transmits R-PDCCH of three sets (set #0 to set #3) is prepared. In aggregation size 4, a candidate which transmits R-PDCCH of two sets (set #0 to set #1) is prepared, and in aggregation size 8, a candidate that transmits R-PDCCH of one set (set #0) is prepared. The base station 300 selects a set that transmits R-PDCCH among the above-described sets.

In FIG. 20, when the search space of R-PDCCH is mapped from VRB to PRB, consecutive PRBs are allocated. In this case, for example, if the RBG size is 3, the set of aggregation size 2 is arranged over two RBGs. In FIG. 20, the set #1 of aggregation size 2 is arranged over RBG #0 and RBG #1. As described above, if the set of aggregation size 2 is arranged over plural RBGs (for example, from RBG #0 to RBG #1), the RBG is unable to be allocated to (R-) PDSCH of the mobile station or other relay station 400 although only one PRB in the RBG is used for R-PDCCH. Accordingly, the flexibility of scheduling of the base station 300 worsens.

Accordingly, in this embodiment, in RBG size 2 or more, the base station 300 arranges the set of aggregation size 2 in one RBG without arranging over plural RBGs. By arranging the set in one RBG, the number of RBGs in which R-PDCCH is arranged can be reduced. Further, the base station 300 performs PRB bundling with respect to R-PDCCH, and if the PRB bundling size is equal to the RBG size or the integral multiple of the PRB bundling size is the RBG size, the base station 300 can use the same precoding with respect to two PRBs in which R-PDCCH of aggregation size 2 is transmitted.

Figure 21:
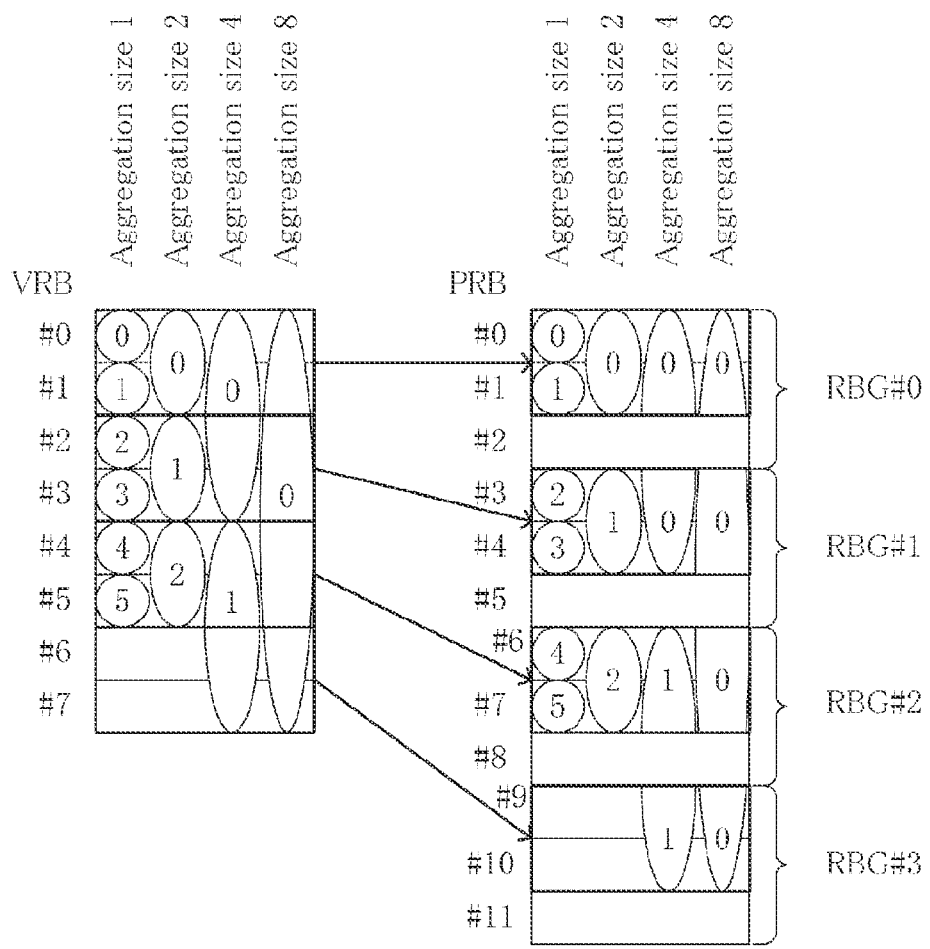
FIG. 21 is a diagram illustrating an arrangement example in a case where RBG size is 3.

FIG. 21 is a diagram illustrating an arrangement example in the case of RBG size 3. In this example, the allocation of PRBs in the unit of an RBG is instructed from the base station 300 to the relay station 400. The base station 300 performs mapping of the search space of R-PDCCH on the PRB in the unit of two RBs of the VRB. Although the base station 300 allocates RBG #0, RBG #1, RBG #2, and RBG #3 to the search space of R-PDCCH and notifies the relay station 400 of this, the PRBs on which the VRB is mapped is limited to two PRBs among three PRBs that constitute the RBG. In FIG. 21, among three PRBs that constitute the RBG, two PRBs having relatively small PRB numbers are selected. That is, PRB #0, #1 included in RBG #0, PRB #3, #4 included in RBG #1, PRB #6, #7 included, in RBG #2, and PRB #9, #10 included in RBG #3 become the PRBs that map the VRB. Further, in the mapping from VRB to PRB, it is assigned sequentially by the small thing of the RB number. Accordingly, VRB #0 is mapped on PRB #0, and VRB #7 is mapped on PRB #10.

For example, the set of aggregation size 4 is arranged in every two PRBs in two RBGs. That is, the set #0 of aggregation size 4 is arranged in two PRBs (PRB #0, #1) in RBG #0 and two PRBs (PRB #3, #4) in RBG #1, and the set #1 of aggregation size 4 is arranged in two PRBs (PRB #6, #7) in RBG #2 and two PRBs (PRB #9, #10) in RBG #3.

Further, in this embodiment, in selecting the two RBs on which VRB is mapped, two PRBs having relatively small PRB numbers are selected. However, two large PRBs or two PRBs at both ends may be selected.

As described above, according to this embodiment, although the base station 300 notifies the PRB that maps on the VRB in the unit of an RBG, the relay station 400 performs blind decoding only with respect to PRBs, which corresponds to the search space, among the PRBs that constitute the notified RBG. By performing notification in the unit of an RBG as described above, the number of bits that are required for the notification can be reduced.

Further, as a method in which the base station 300 notifies of the RBG on which the VRB is mapped, the RBGs having small RBG numbers among the mapping RBGs and an interval between RBGs may be designated. At this time, interval information, may be notified from the base station 300 to the relay station 400, or may be shared and maintained in advance between the base station 300 and the relay station 400. For example, if RBG #1 and the interval 3 are designated, RBG #1, RBG #4, RBG #7, and RBT#10 are designated as RBGs on which the VRB is mapped.

Figure 22:
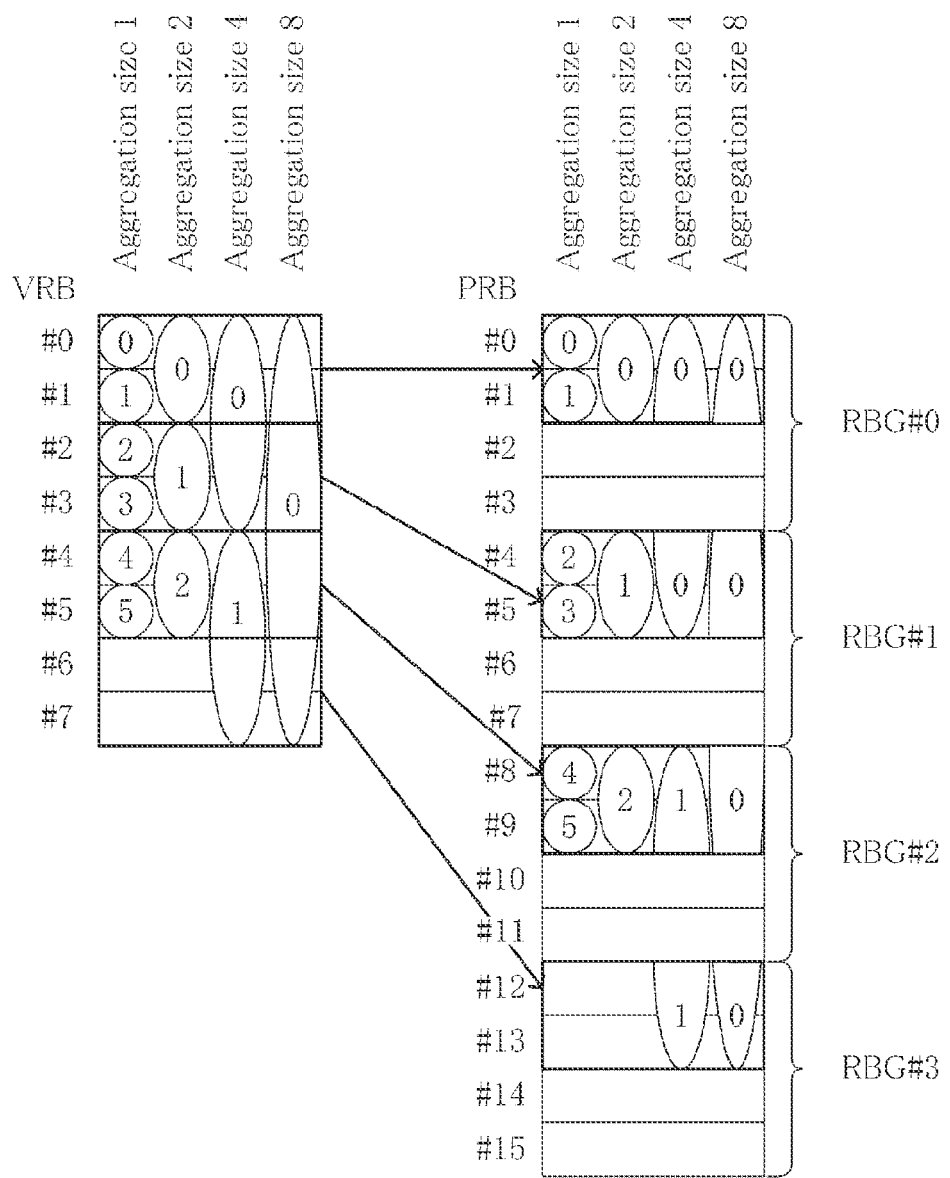
FIG. 22 is a diagram illustrating an arrangement example (1) in a case where RBG size is 4.

FIG. 22 illustrates an arrangement example (1) in the case of RBG size 4. VRB is the same as that in FIG. 21. Even in this example, the allocation of PRBs in the unit of an RBG is instructed from the base station 300 to the relay station 400. In the example illustrated in FIG. 22, the base station 300 performs mapping on the PRB in the unit of two RBs of the VRB. In the same manner as in FIG. 21, the base station 300 allocates RBG #0, RBG #1, RBG #2, and RBG #3 to the search space of R-PDCCH and notifies the relay station 400 of this. The PRBs on which the VRB is mapped is limited to two PRBs among four PRBs that constitute the RBG. In the example of selecting two PRBs having relatively small numbers, PRB #0, #1 included in RBG #0, PRB #4, #5 included in RBG #1, PRB #8, #9 included in RBG #2, and PRB #12, #13 included in RBG #3 become the PRBs that map the VRB. In the mapping from VRB to PRB, it is assigned sequentially by the small thing of the RB number. Accordingly, VRB #0 is mapped on PRB #0, and VRB #7 is mapped on PRB #13. At this time, the set of aggregation size 4 is arranged in every two PRBs in two RBGs.

Further, in selecting the two PRBs, in this embodiment, two PRBs having relatively small PRB numbers are selected. However, two large PRBs or two PRBs in another combination may be selected.

Figure 23:
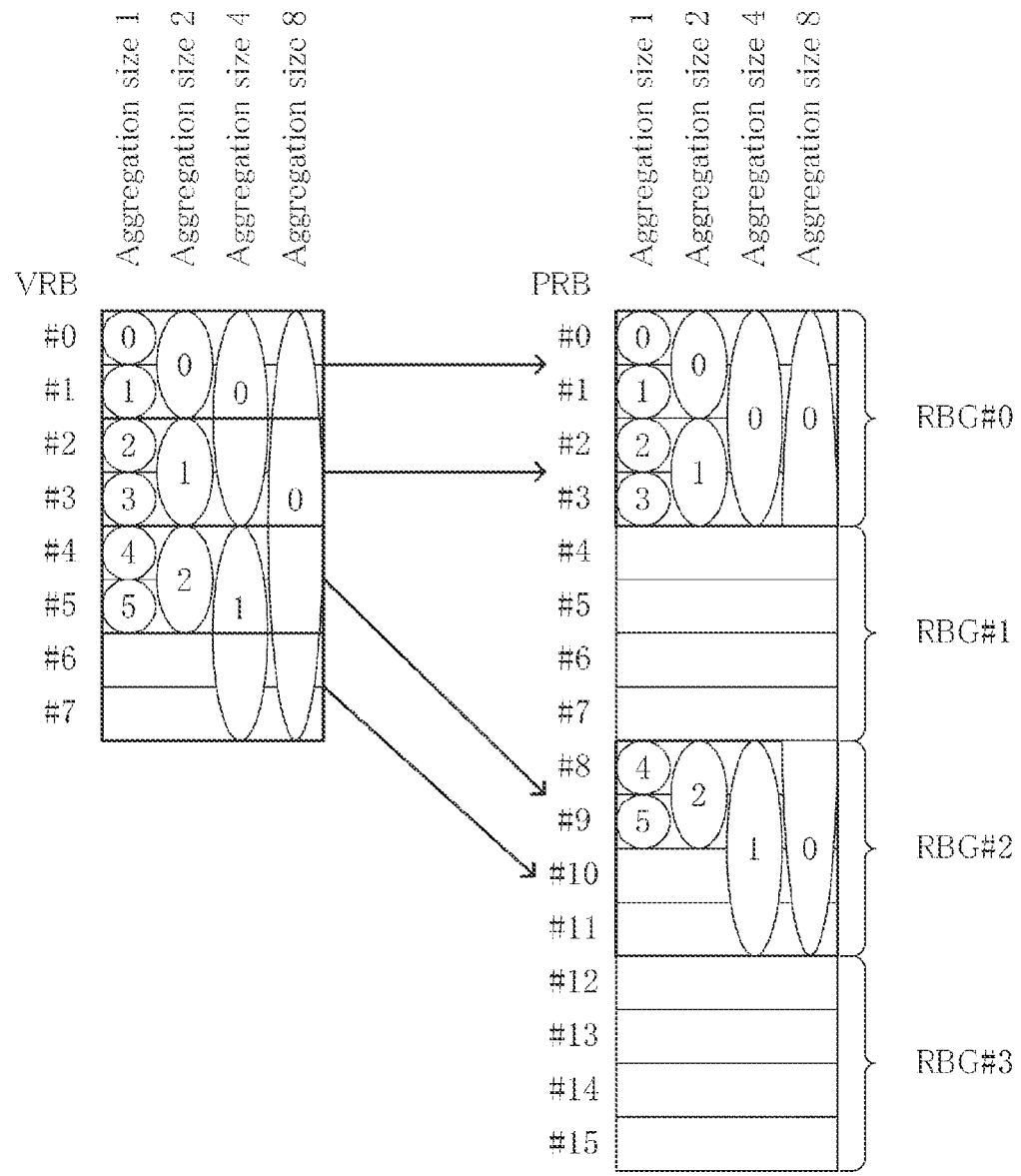
FIG. 23 is a diagram illustrating an arrangement example (2) in a case where RBG size is 4.

FIG. 23 illustrates an arrangement example (2) in the case of RBG size 4. In the example illustrated in FIG. 23, the allocation of PRBs in the unit of an RBG is instructed from the base station 300 to the relay station 400. In this example, the base station 300 performs mapping of the search space of R-PDCCH on the PRB in the unit of four RBs of the VRB. If the search space of R-PDCCH is mapped on the RBG in the unit of four RBs of the VRB in the case where the RBG size is 4, sets of aggregation sizes 1, 2, and 4 are arranged in one RBG.

In the example illustrated in FIG. 23, if the base station 300 allocates RBG #0 and RBG #2 to the search space of R-PDCCH, it notifies the relay station 400 of this. The PRBs on which the VRB is mapped become all the four PRBs that constitute the RBG. In the mapping from VRB to PRB, it is assigned sequentially by the small thing of the RB number. Accordingly, VRB #0 is mapped on PRB #0, and VRB #7 is mapped on PRB #11. At this time, the set of aggregation size 4 is arranged in one RBG.

As regards which of the example illustrated in FIG. 22 in which the VRB is allocated to PRB in the unit of two RBs and the example illustrated in FIG. 23 in which the VRB is allocated to PRB in the unit of four RBs is to be used, there are a method (1) in which the base station 300 determines the example in advance and a method (2) in which the base station 300 changes the example dynamically or semi-statically depending on the number of allocated RBGs. In the method (1) in which the base station 300 determines the example in advance, the base station 300 performs mapping on the PRB in the unit of two RBs of the VRB irrespective of the RBG size. At this time, in the RBG size 1, since the number of RBs that constitute the RBG is 1, two RBs are unable to be allocated. Accordingly, the base station 300 may set to allocate two RBs using the RBG instructed by the base station 300 and the RBG adjacent to the RBG. In the method (2) in which the base station 300 changes the example illustrated in FIG. 22 and the example illustrated in FIG. 23 dynamically or semi-statically depending on the number of allocated RBGs, if the VRB size set by the search space of R-PDCCH is equal to or less than twice the number of RBGs allocated from the base station 300 in the case where the RBG size is 4, the example illustrated in FIG. 22 is used. If the VRB size is equal to or larger than twice the number of RBGs allocated from the base station 300 and equal to or smaller than four times the number of RBGs allocated from the base station 300, the example illustrated in FIG. 23 is used. As described, above, if it is possible to dynamically or semi-statically switches the example illustrated in FIG. 22 and the example illustrated in FIG. 23, the flexibility of scheduler of the base station 300 is improved.

Further, if the RBG size is 4 and the VRB is allocated to PRB in the unit of two RBs, the base station 300 may select whether to use the two RBs having small PRB numbers or to use the two PRBs having large PRB numbers for each relay station. Through this, by allocating the same RBG to two relay stations, one relay station uses two PRBs having small numbers, the other relay station uses two PRBs having large numbers, and R-PDCCH of the two relay stations can be arranged in the same RBG. Further, in the case of performing the PRB bundling by dividing two PRBs, that is, the PRB of the small number and the PRB of the large number, the two RBs can use the same preceding.

Further, if the RBG size is 3 and the VRB is allocated to PRB in the unit of two RBs, the base station 300 may select whether to use the two RBs having small PRB numbers or to use the two PRBs having large PRB numbers for each relay station. Through this, by allocating the same RBG to two relay stations, if one relay station uses two PRBs having small numbers and the other relay station uses two PRBs having large numbers, the PRBs having intermediate numbers are shared. However, if the one relay station corresponds to aggregation size 1 and the other relay station corresponds to aggregation size 2, R-PDCCH of the two relay stations can be arranged in the same RBG.

Further, the base station 300 may determined in advance that in RBG size 1, the VRB is allocated to the PRB in the unit of one RB, in RBG size 2 or 3, the VRB is allocated to the PRB in the unit of two RBs, and in RBG size 4, the VRB is allocated to the PRB in the unit of four RBs.

Further, the base station 300 may directly map the search space of R-PDCCH on the PRB without mapping the search space of R-PDCCH from VRB to PRB. In the case where the base station 300 directly performs mapping, the base station directly sets different search spaces onto the PRB for each RBG size. The selection method of the set PRB may be performed suing the above-described method. As described above, the VRB size is replaced by the RB size of the search space.

Figure 24:
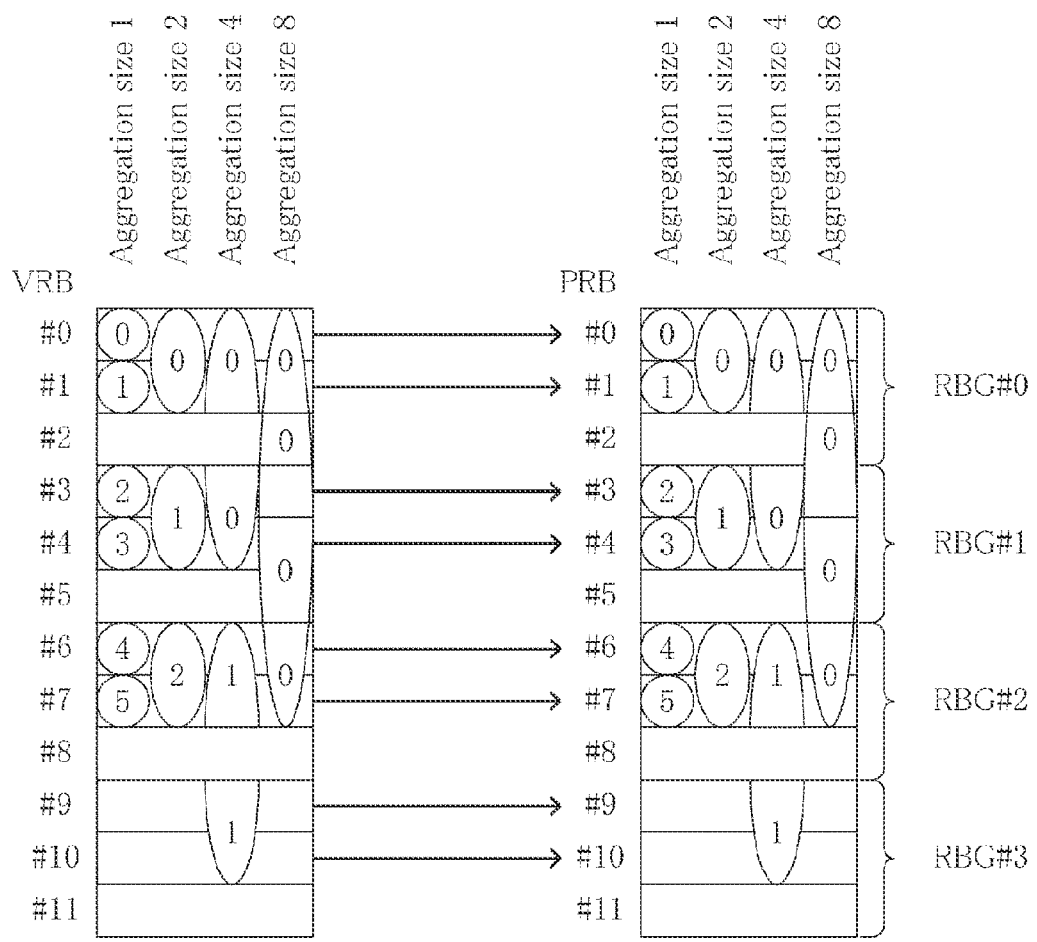
FIG. 24 is a diagram illustrating an example of one-to-one mapping.

Further, in the case of setting the mapping PRB of VRB in a one-to-one manner, the base station 300 allocates different search spaces to the VRB for each RBG size. The allocation method of the VRB may be performed using the above-described PRB allocation method. FIG. 24 illustrates an example of one-to-one mapping.

If the RBG size is 3 and the VRB is allocated with R-PDCCH, the set of aggregation size 2 is arranged in the RB of one RBG in the mapped PRB. At this time, the aggregation size 8 may be allocated to successive RB #0 to #7 of VRB. Through this, the number of RBGs to which the set of aggregation size 8 is allocated becomes 3. In the same manner as aggregation size 4, if the aggregation size 8 is allocated to successive RB #0, #1, #3, #4, #6, #7, #9, and #10 of the VRB, the number of RBGs to which the set of aggregation size 8 is allocated becomes 4, and the number of RBGs that can be allocated 1RBG can be reduced.

Further, for each aggregation size, different PRB may be mapped.

The search space may be commonly set with "DL grant" and "UL grant" or may be individually set.

Further, the number of sets of aggregation is not limited to the above-described, value. Aggregation size 1 may correspond to 6 sets, aggregation size 2 may correspond to 6 sets, aggregation size 4 may correspond to 2 sets, and aggregation size 8 may correspond to 2 sets, or may correspond, to other values.

Figure 25:
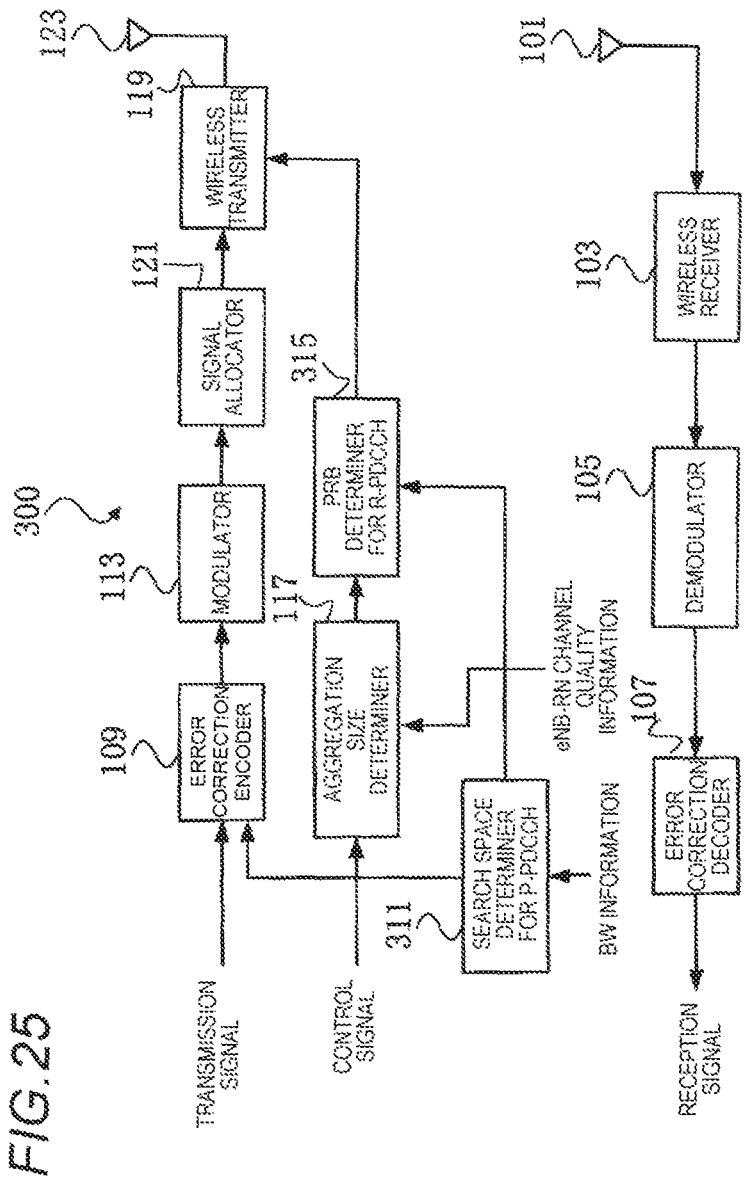
FIG. 25 is a block diagram illustrating the configuration of a base station 300.

FIG. 25 is a block diagram illustrating the configuration of the base station 300 according to embodiment 2. The base station 300 according to embodiment 2 includes a reception antenna 101, a wireless receiver 103, a demodulator 105, an error correction decoder 107, an error correction encoder 109, a search, space determiner 311 for R-PDCCH, a modulator 113, a PRB determiner 315 for R-PDCCH, an aggregation size determiner 117, a wireless transmitter 119, a signal allocator 121, and a transmission antenna 123. The base station 300 according to embodiment 2 is different from the base station 100 according to embodiment 1 on the point that the search space determiner 311 for R-PDCCH and the PRB determiner 315 are provided instead of the search space determiner 111 for R-PDCCH and the PRB determiner 115 for R-PDCCH. Embodiment 2 is the same as embodiment 1 except for the above-described point, and in FIG. 25, the same reference numerals are given to constituent elements that are common to those illustrated in FIG. 18.

The wireless receiver 103 receives a signal from the relay station 400 through the reception antenna 101, performs wireless processing such as down conversion and the like, and outputs the processed signal to the demodulator 105.

The demodulator 105 demodulates the signal input from the wireless receiver 103 and outputs the demodulated signal to the error correction decoder 107.

The error correction decoder 107 decodes the signal input from the demodulator 105 and outputs a reception signal.

The error correction encoder 109 inputs a transmission signal and search space information of R-PDCCH input from the search space determiner 311 for R-PDCCH, performs error-correction-encoding of the transmission signal to output the transmission signal to the modulator 113. Here, the search space information of R-PDCCH is information that indicates a candidate of a resource area that transmits a control signal (R-PDCCH) for relay station 400 based on system bandwidth, information (BW information). Further the search space information is generated in the unit of an RBG or in the unit of a PRB.

The search space determiner 311 for R-PDCCH generates a PRG size and an RBG size based on the system bandwidth information (BW information). Further, the search space determiner 311 for R-PDCCH determines the search space as the candidate of the resource area that transmits a control signal (R-PDCCH) for relay station 400 and generates the search space information of R-PDCCH. As described above with reference to FIGS. 20 to 24, the search space information for R-PDCCH according to this embodiment may be allocated to a VRB (Virtual Resource Block) through a logic channel, and then allocated to the PRB through a physical channel. Then, the search space determiner 311 for R-PDCCH outputs the generated search space information for R-PDCCH to the error correction encoder 109. Further, the search space determiner 311 for R-PDCCH outputs the PRG size, the RBG size, and the generated search space information to the PRB determiner 315 for R-PDCCH.

The aggregation size determiner 117 determines the aggregation size of the control signal according to channel quality information between the subject station and the relay station 400 (eNB-RN channel quality information). The aggregation size determiner 117 encodes the control signal according to the determined, aggregation size and outputs the encoded, control signal to the PRB determiner 315 for R-PDCCH.

The PRB determiner 315 for R-PDCCH determines the PRB, which actually transmits R-PDCCH, among the PRBs included in the search space for R-PDCCH from the R-PDCCH aggregation size, the channel quality information between the subject station and the relay station 400, the search space information, and the RBG size. Further, the RPB determiner 315 for R-PDCCH selects the PRB, which is targeted for PRB bundling, among the PRBs included in the search, space and allocates R-PDCCH to the selected PRB. That is, the PRB determiner 315 for R-PDCCH also functions as an allocator that selects the PRB, which is targeted for PRB bundling, among the PRBs included in the search, space, and allocates R-PDCCH that is the control signal for relay station 400 to the selected PRB. The R-PDCCH allocated to the PRB is preceded for each PRG and even the DM-RS that is output to the wireless transmitter 119 is preceded, for each PRG and is output to the wireless transmitter 119.

The modulator 113 modulates the transmission signal and outputs the modulated, transmission signal to the signal allocator 121.

The signal allocator 121 allocates the transmission signal input from the modulator 113 to the resource and outputs the transmission signal to the wireless transmitter 119.

The wireless transmitter 119 performs wireless processing, such as up-conversion and the like, with respect to the transmission signal allocated to the resource through the signal, allocator 121, and transmits the transmission signal from the transmission antenna 123 to the relay station 400.

Figure 26:
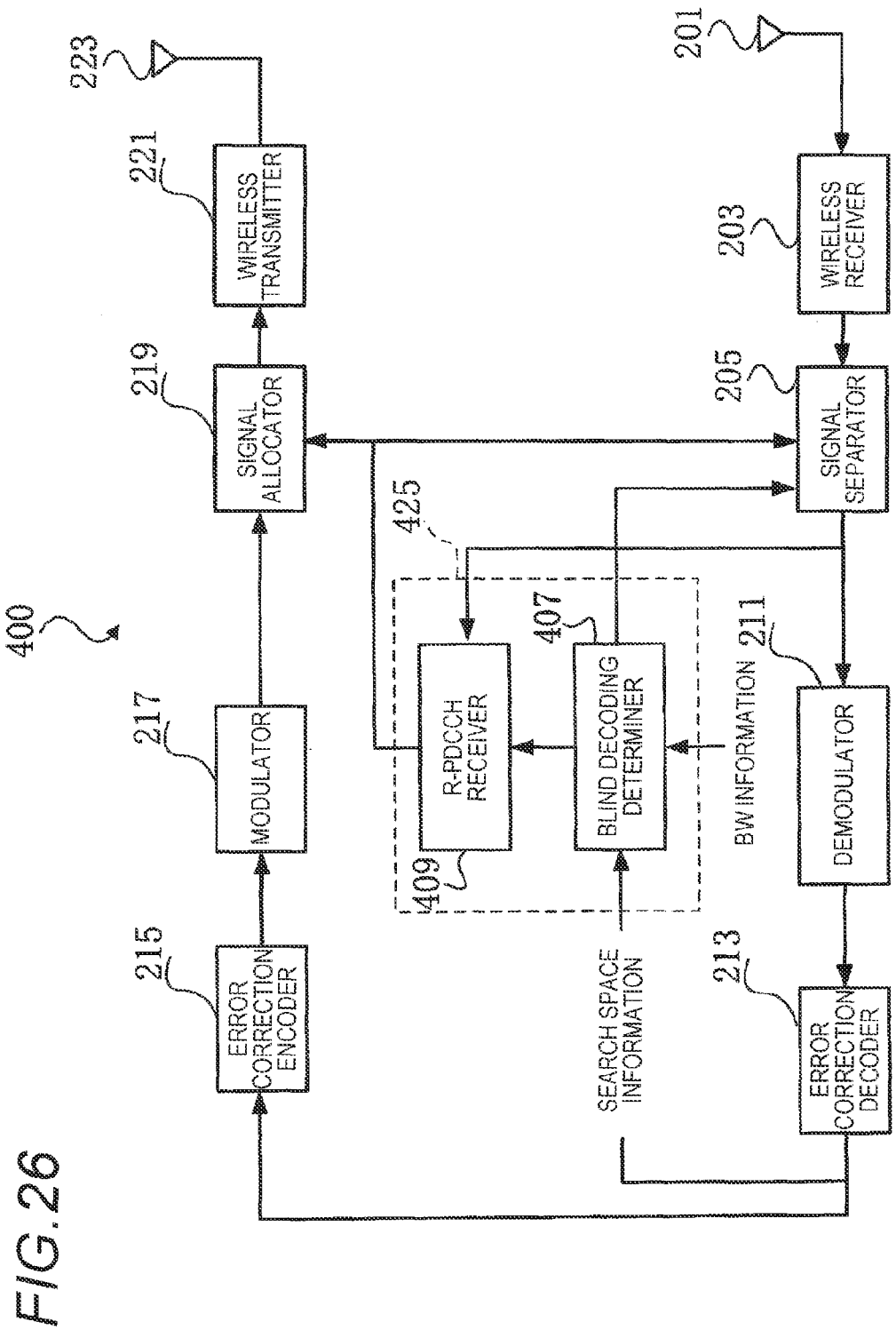
FIG. 26 is a block diagram illustrating the configuration of a relay station 400.
Figure 28:
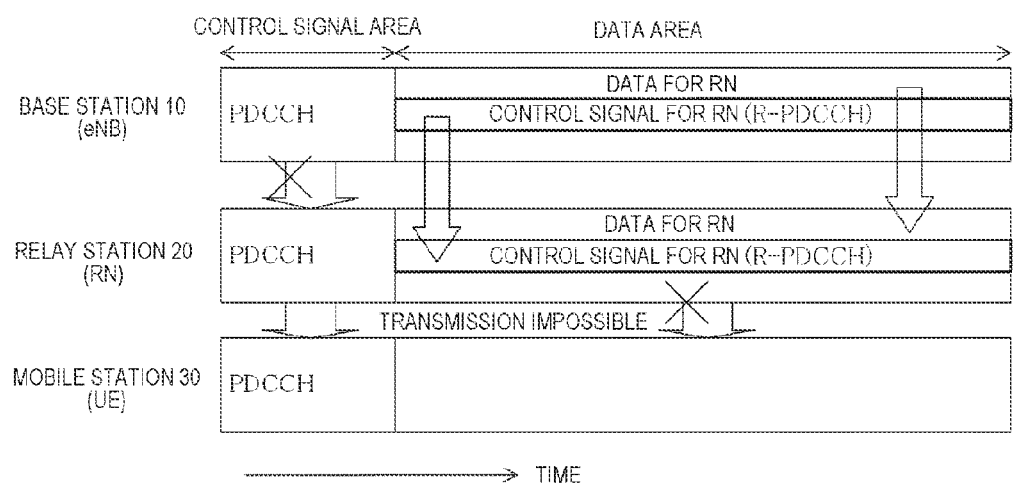
FIG. 28 is a diagram, illustrating an example of allocation of a control signal and data in a subframe of each station in an LTE system.
Figure 29:
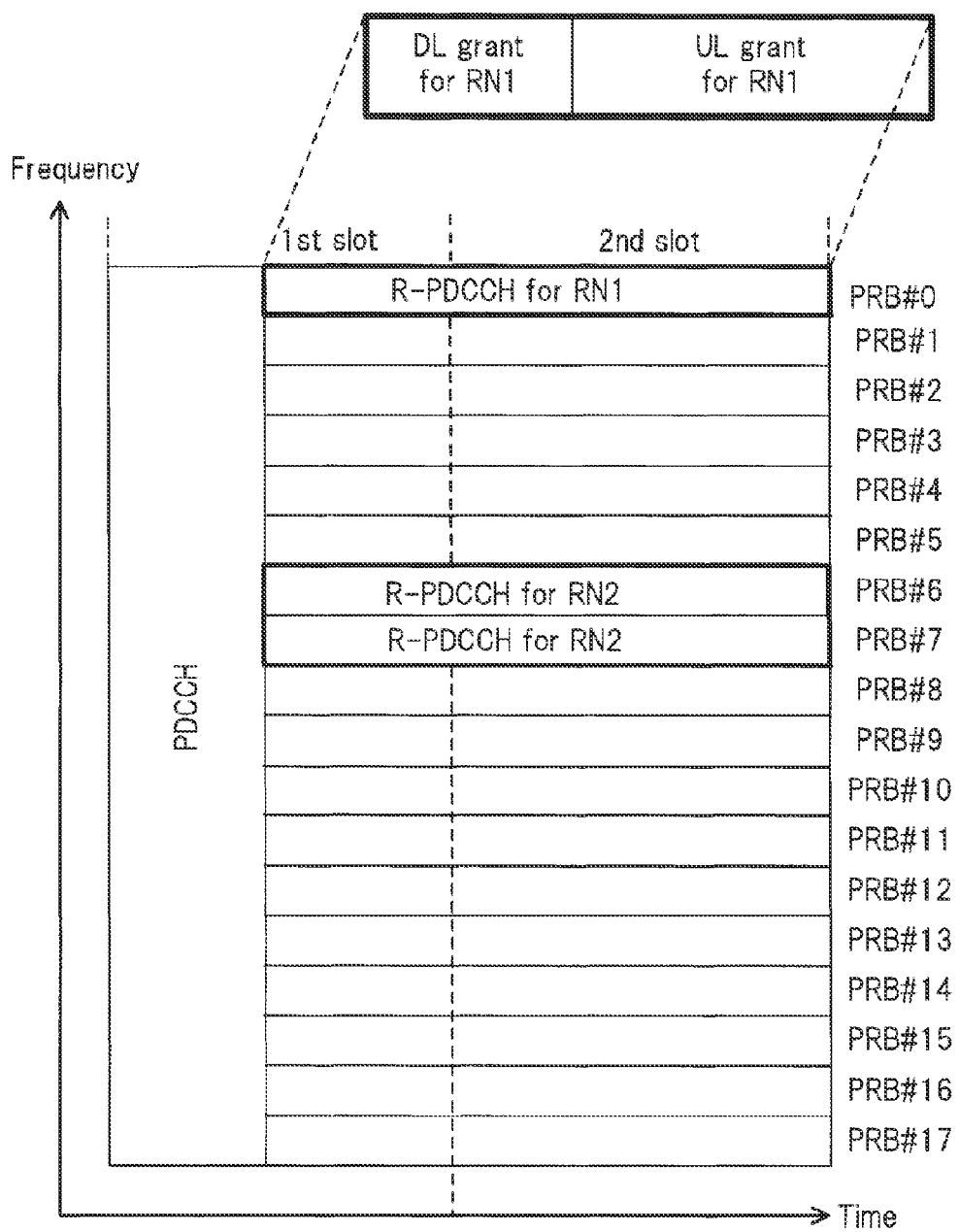
FIG. 29 is a diagram illustrating an arrangement example of R-PDCCH.
Figure 30:
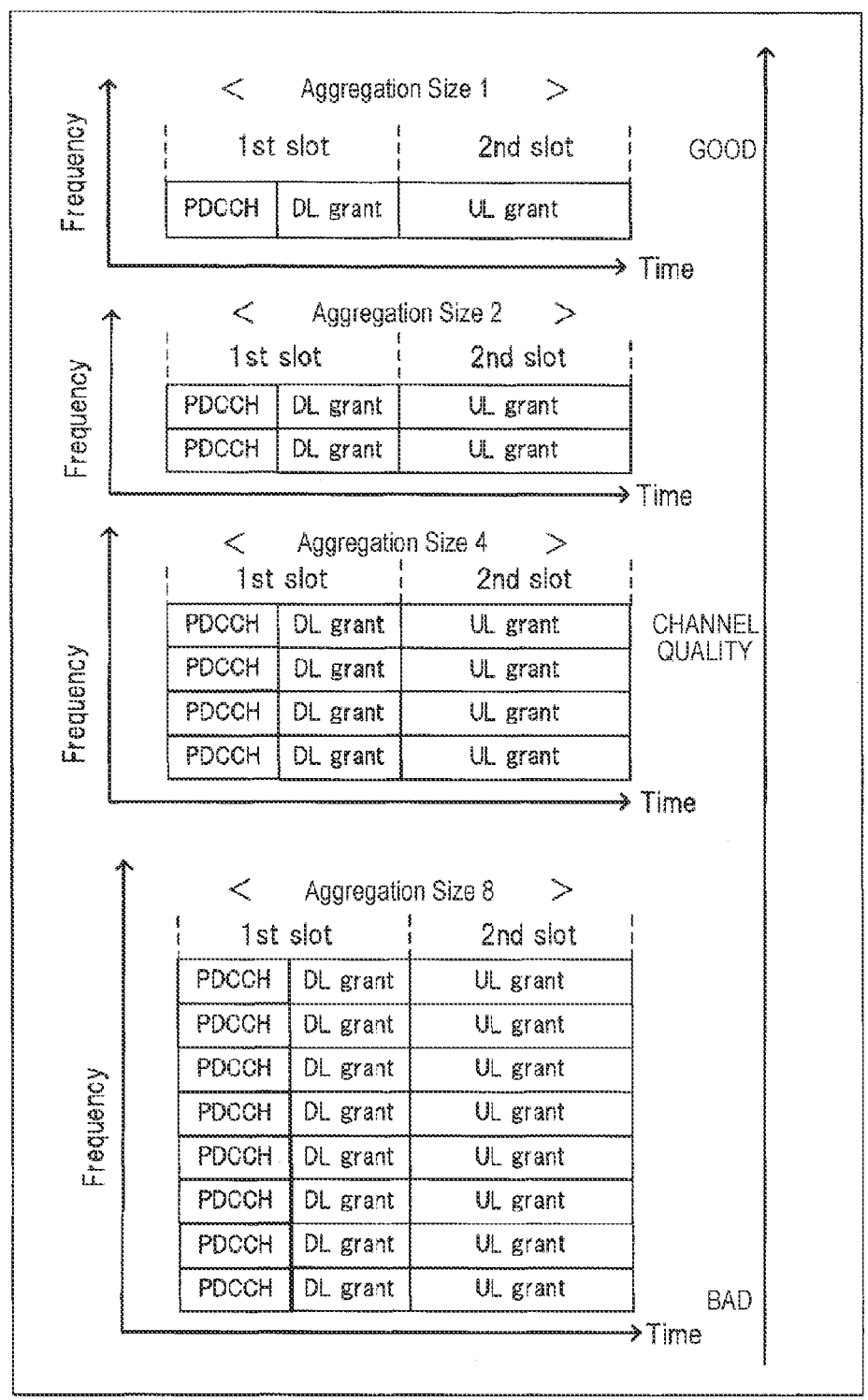
FIG. 30 is a conceptual diagram illustrating plural aggregation sizes of R-PDCCH.

FIG. 28 is a block diagram illustrating the configuration of a relay station 400 according to embodiment 2. The relay station 400 according to embodiment 2 is different from the relay station 200 according to embodiment 1 on the point that a blind decoder 425 having a decoding determiner 407 and an R-PDCCH receiver 409 is provided instead of the blind decoder 225. Except for this point, embodiment 2 is the same as embodiment 1, and in FIG. 26, the same reference numerals are given to constituent elements that are common to those illustrated in FIG. 19, and the detailed description thereof will be omitted.

If the R-PDCCH search space information (R-PDCCH allocation information) is in the unit of an RBG, the blind decoding determiner 407 generates the RBG size and the PRB bundling size rather than the system bandwidth information (BW information). Further, the blind decoding determiner 407 selects the PRB to be blinded among PRBs that constitute an RBG designated by the search space information, generates blind decoding information, and outputs the generated blind decoding information to the signal separator 205 and the R-PDCCH receiver 409.

Here, the selection method of the PRB that is targeted for blind decoding follows the above-described, method, in which the set of aggregation size 2 is set to be arranged in one RBG. Further, the blind decoding determiner 407 constitutes a part of the blind decoder 425.

Here, the blind decoding information is information that indicates the PRB to be blind-decoded among the PRBs included in the search space, and is changed depending on the aggregation size and the RBG size. As described, above with reference to FIGS. 20 to 24, the PRB to be blind-decoded is the PRB that has a possibility that R-PDCCH for the subject station, is arranged.

The R-PDCCH receiver 409 detects R-PDCCH by performing blind decoding based on the blind decoding information. "DL grant" included in R-PDCCH is output to the signal separator 205 and "UL grant" included in R-PDCCH is output to the signal allocator 219. Further, the R-PDCCH receiver 409 constitutes a part of the blind decoder 425.

Further, in the above-described embodiments, it is described that the relay station 200 (or relay station 400) receives R-PDCCH. However, the constituent element that receives R-PDCCH is not limited thereto. For example, a mobile station may receive R-PDCCH from the base station 100 (or base station 300).

Further, in the above-described embodiments, about the numbering of RBGs, even numbers and odd numbers may be reversed.

In the above-described embodiments, the antenna has been used, but an antenna port may be applied similarly. The antenna port refers to a logical antenna configured by one physical, antenna or a plurality of physical antennas. That is, the antenna port is not limited to the antenna port configured by one physical antenna, but may refer to an array antenna or the like configured by a plurality of antennas. For example, in LTE, it is not regulated how many physical antennas are used to configure an antenna port. The antenna port is regulated, as the minimum unit in which a base station can transmit different reference signals. Further, the antenna port is sometimes regulated as the minimum unit used to multiply a weight of a Precoding vector.

Each functional block described, in the above-described embodiments is generally realized by an LSI which is an integrated circuit. The functional blocks may be separately integrated, as one chip, or some or all of the functional blocks may be integrated as one chip. Here, the functional blocks are integrated as an LSI. However, the LSI may be called, an IC, a system LSI, a super LSI, or an ultra LSI.

The method of forming the functional blocks as an integrated circuit is not limited, to the LSI, but may be realized by a dedicated circuit or a general processor. After the LSI is manufactured, a programmable FPGA (Field Programmable Gate Array) or a reconfigurable processor capable of reorganizing the connection or setting of circuit cells in the LSI may be used.

When techniques for an integrated circuit substituting the LSI are developed with advance in semiconductor techniques or derived separate techniques, the functional blocks may, of course, be integrated using the developed techniques. Biotechniques may be applied.

The detailed and specific embodiments of the invention has been described, but it is apparent to those skilled in the art that the invention is modified or corrected without departing from the spirit and scope of the invention.

The present application is based on Japanese Patent Application (Japanese Patent. Application No. 2010-141006) filed on Jun. 21, 2010 and Japanese Patent Application (Japanese Patent Application No. 2010-210086) filed on Sep. 17, 2010, the contents of which are hereby incorporated by reference.

INDUSTRIAL APPLICABILITY

The wireless communication apparatus and the wireless communication method according to the present invention have the effects that the channel estimation accuracy of "DL grant" that instructs data allocation of the downlink of R-PDCCH can be improved, and are useful as the wireless communication apparatus and the like.

REFERENCE SIGNS LIST 100, 300: base station
101: reception antenna
103: wireless receiver
105: demodulator
107: error correction decoder
109: error correction encoder
111, 311: search space determiner for R-PDCCH
113: modulator
115, 315: PRB determiner for R-PDCCH
117: aggregation size determiner
119: wireless transmitter
121: signal allocator
123: transmission antenna
200, 400: relay station
201: reception antenna
203: wireless receiver
205: signal separator
207, 407: blind decoding determiner
209, 409: R-PDCCH receiver
211: demodulator
213: error correction decoder
215: error correction encoder
217: modulator
219: signal allocator
221: wireless transmitter
223: transmission antenna
225, 425: blind decoder

The invention claimed is:

1. A wireless communication apparatus, comprising:
a receiver that is configured to receive a control signal; and
a blind decoder that is configured to perform a blind decoding of a plurality of adjacent physical resource blocks (PRBs) in which the same precoding is used in a unit of an RB group (RBG) that is composed of a plurality of PRBs, wherein the adjacent PRBs on which the blind decoding is performed are determined according to an aggregation size of the corresponding RBG unit, and to detect a resource area to which a control signal for the wireless communication apparatus that is included in the control signal is allocated.

2. The wireless communication device according to claim 1, wherein
the blind decoder performs the blind decoding of the plurality of adjacent physical resource blocks (PRBs) on which VRB is mapped in the unit of the RB group (RBG) that is composed of the plurality of PRBs and in which the same precoding is used in the unit of the RBG, and detects the resource area to which the control signal for the wireless communication apparatus that is included in the control signal is allocated.

3. A wireless communication apparatus, comprising:
a search space determiner that is configured to determine a search space in a unit of an RB group (RBG) that is composed of a plurality of physical resource blocks (PRBs);
an aggregation size determiner that is configured to determine an aggregation size of a control signal for a communication partner apparatus based on a channel quality between the wireless communication apparatus and the communication partner apparatus;
an allocator that is configured to allocate the control signal for the communication partner apparatus to a plurality of adjacent PRBs in which the same precoding is used among the plurality of PRBs included in the search space, based on the determined aggregation size and the channel quality, wherein the adjacent PRBs are determined according to the aggregation size of the corresponding RBG unit; and
a transmitter that is configured to transmit the allocated control signal for the communication partner apparatus.

4. The wireless communication apparatus according to claim 3, wherein
when the search space determiner determines the search space in a unit of an RBG that is composed of three PRBs, and the aggregation size determiner determines the aggregation size as 2,
the allocator allocates the control signal for the communication partner apparatus to two upper PRBs of the three PRBs in an RBG having an RBG number being 2n, where n is 0 or a positive integer, in the determined search space and allocates the control signal for the communication partner apparatus to two lower PRBs of the three PRBs in an RBG having an RBG number being 2n+1 in the determined search space.

5. The wireless communication apparatus according to claim 3, wherein
when the search space determiner determines a first search space that is composed of RBGs having an RBG number being 2n, where n is 0 or a positive integer, and having an RBG number being 2n+1, or a second search space that is composed of RBGs having an RBG number being 2n+1 and 2n+2, wherein the first space or the second space is designated in a unit of an RBG that is composed of three RBGs, and the aggregation size determiner determines the aggregation size as 4,
the allocator allocates the control signal for the communication partner apparatus to two upper PRBs of the three PRBs in an RBG having an RBG number being 2n, and allocates the control signal for the communication partner apparatus to two lower PRBs of the three PRBs in an RBG having an RBG number being 2n+1, in the determined first search space, and
the allocator allocates the control signal for the communication partner apparatus to two lower PRBs of the three PRBs in an RBG having an RBG number being 2n+1, and allocates the control signal for the communication partner apparatus to two upper PRBs of the three PRBs in an RBG having an RBG number being 2n+2, in the determined second search space.

6. The wireless communication apparatus according to claim 3, wherein
when the search space determiner determines the search space in a unit of an RBG that is composed of three PRBs, and the aggregation size determiner determines the aggregation size as 1,
the allocator allocates the control signal for the communication partner apparatus to a center PRB of the three PRBs in the determined search space.

7. The wireless communication apparatus according to claim 3, wherein when the search space determiner determines the search space in a unit of an RBG that is composed of four PRBs, and the aggregation size determiner determines the aggregation size as 2, the allocator allocates the control signal for the communication partner apparatus to two upper PRBs or two lower PRBs of the four PRBs in the determined search space.

8. The wireless communication apparatus according to claim 3, wherein when the search space determiner determines the search space in a unit of an RBG that is composed of three PRBs, and the aggregation size determiner determines the aggregation size as 4, the allocator allocates the control signal for the communication partner apparatus to two PRBs having an RBG number being n, where n is 0 or a positive integer, and to two PRBs having an RBG number being n+1, in the determined search space.

9. The wireless communication device according to claim 3, wherein the allocator allocates the control signal for the communication partner apparatus to the plurality of adjacent PRBs in which the same precoding is used among the plurality of PRBs on which VRB is mapped in the unit of the RBG and which are included in the search space, based on the determined aggregation size and the channel quality.

10. A wireless communication method, comprising:

receiving a control signal; and performing a blind decoding, as a search space, of a plurality of adjacent physical resource blocks (PRBs) in which the same precoding is used in a unit of RB group (RBG) that is composed of a plurality of PRBs, wherein the adjacent PRBs on which the blind decoding is performed are determined according to an aggregation size of the corresponding RBG unit, and detecting a resource area to which a control signal for an own apparatus that is included in the control signal is allocated.

11. A wireless communication method, comprising:

determining a search space in a unit of an RB group (RBG) that is composed of a plurality of physical resource blocks (PRBs);

determining an aggregation size of a control signal for a communication partner apparatus based on a channel quality between an own apparatus and the communication partner apparatus;

allocating the control signal for the communication partner apparatus to a plurality of adjacent PRBs in which the same precoding is used among the plurality of PRBs included in the search space based on the determined aggregation size and the channel quality, wherein the adjacent PRBs are determined according to the aggregation size of the corresponding RBG unit; and transmitting the allocated control signal for the communication partner apparatus.

12. A wireless communication base station apparatus comprising the wireless communication apparatus according to claim 3.

13. A wireless communication relay station apparatus comprising the wireless communication apparatus according to claim 1.

* * * * *